United States Patent [19]

Takeo et al.

[11] Patent Number: 4,849,995
[45] Date of Patent: Jul. 18, 1989

[54] DIGITAL SIGNAL TRANSMISSION SYSTEM HAVING FRAME SYNCHRONIZATION OPERATION

[75] Inventors: Hiroshi Takeo, Kawasaki; Masanori Kajiwara, Tokyo; Michinobu Ohhata, Yokohama; Takao Moriya, Hachioji; Satoshi Takeda, Komae; Hiroshi Nakaide; Hiroshi Yamasaki, both of Kawasaki; Toshinari Kunieda, Nagoya; Ikuo Washiyama, Kanazawa, all of Japan

[73] Assignees: Fujitsu Limited, Kawasaki; Nippon Telegraph and Telephone Corporation, Tokyo, both of Japan

[21] Appl. No.: 889,375

[22] Filed: Jul. 25, 1986

[30] Foreign Application Priority Data

| Jul. 26, 1985 | [JP] | Japan | 60-165305 |
| Aug. 28, 1985 | [JP] | Japan | 60-188879 |
| Sep. 5, 1985 | [JP] | Japan | 60-196667 |
| Sep. 5, 1985 | [JP] | Japan | 60-196668 |

[51] Int. Cl.$^4$ .......................................... H04L 7/00
[52] U.S. Cl. .................................. 375/116; 375/106; 375/114; 371/47
[58] Field of Search ............... 375/106, 112, 113, 114, 375/116; 371/41, 42, 47

[56] References Cited

U.S. PATENT DOCUMENTS

| 3,336,467 | 8/1967 | Frey . | |
| 4,599,732 | 7/1986 | Le Fever et al. | 375/114 |
| 4,608,703 | 8/1986 | Kaga et al. | 375/114 |

FOREIGN PATENT DOCUMENTS

| 56-17540(A) | 7/1981 | Japan . |
| 2007465 | 5/1987 | United Kingdom . |

OTHER PUBLICATIONS

D. E. Dodds et al., "Robust Frame Synchronization for Noisy PCM Systems", IEEE Transactions on Communications, vol. COM-33, No. 5, May 1985, pp. 465-469.

A. Weinberg, "Search Strategy Effects on PN Acquisitions Performance", Proceedings IEEE National Telecommunications Conference, Nov. 29-Dec. 3, 1981, vol. 3, pp. F1.5.1-F1.5.5.

International Telegraph and Telephone Consultative Committee, Study Group XVIII Contribution 29.

1984 IEEE, Performance of the Cyclic Redundancy Check Code in the New 1.544 MB/S Extended Framing Format by A. B. Sripad et al.

Japanese Unexamined Patent Publication (Kokai) No. 59-161144 and English Abstract.

Primary Examiner—Stephen C. Buczinski
Assistant Examiner—Linda J. Wallace
Attorney, Agent, or Firm—Staas & Halsey

[57] ABSTRACT

A digital signal transmission system includes a synchronization pattern detection circuit for detecting a synchronization pattern in response to a received transmitted digital signal, a pseudo synchronization detection circuit for detecting a pseudo synchronization pattern in the form of cyclic redundancy code in response to a received transmitted digital signal, and a synchronization protection circuit for counting the synchronization pattern detection signals produced when synchronization patterns are detected in response to a synchronization pattern detection signal from the synchronization pattern detection circuit. The synchronization protection circuit includes a main synchronization counter circuit and an auxiliary synchronization counter circuit. The count of protection steps for the confirmation of synchronization recovery of the auxiliary synchronization counter circuit in accordance with synchronization or asynchronization of the main synchronization counter circuit is variable.

10 Claims, 34 Drawing Sheets

FRAME SYNCHRONIZATION OPERATION

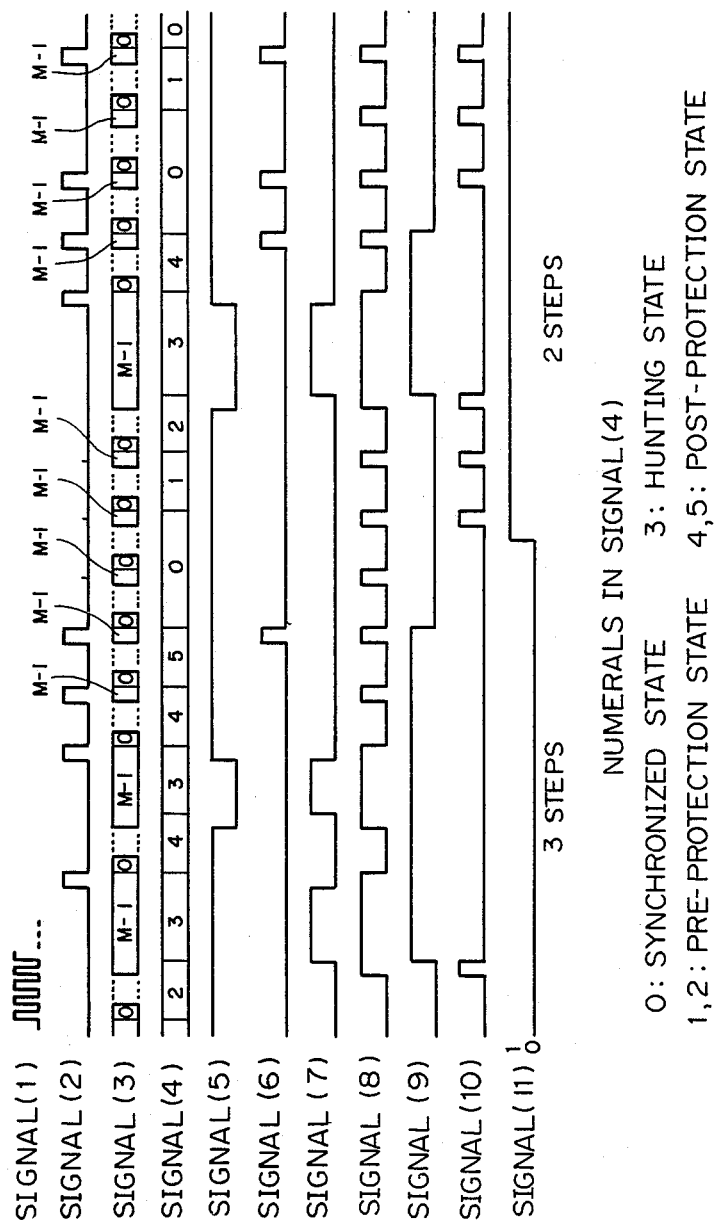

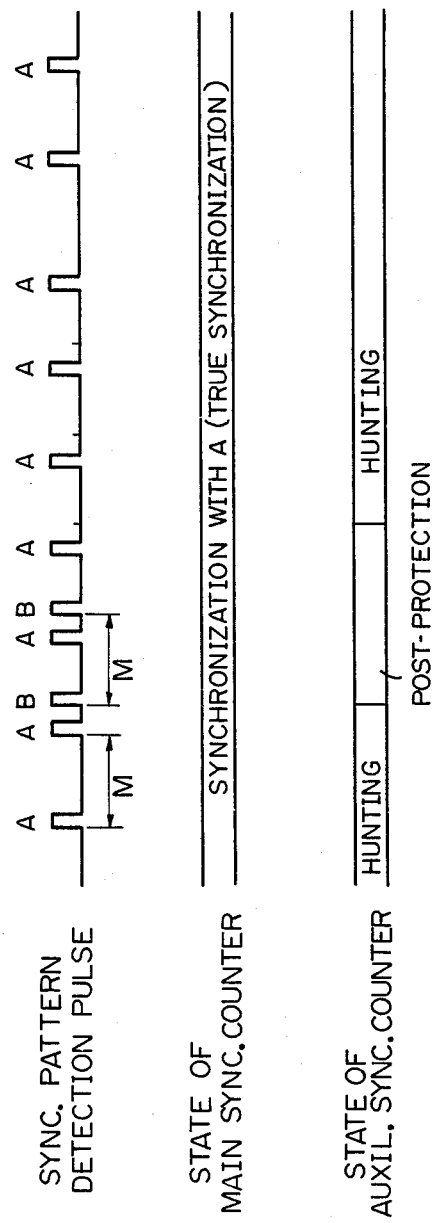

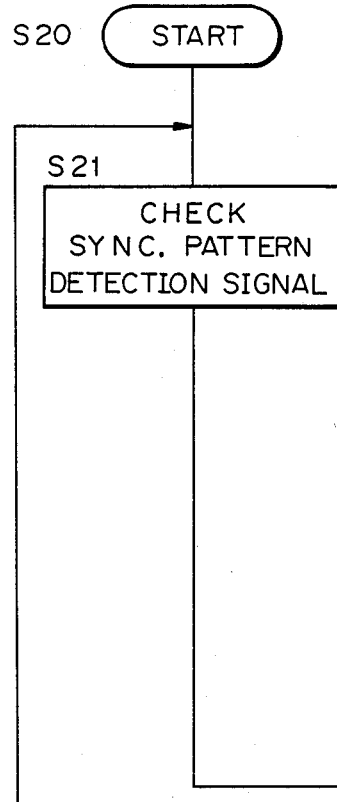

| Fig.13A-1 | Fig.13A-2 |

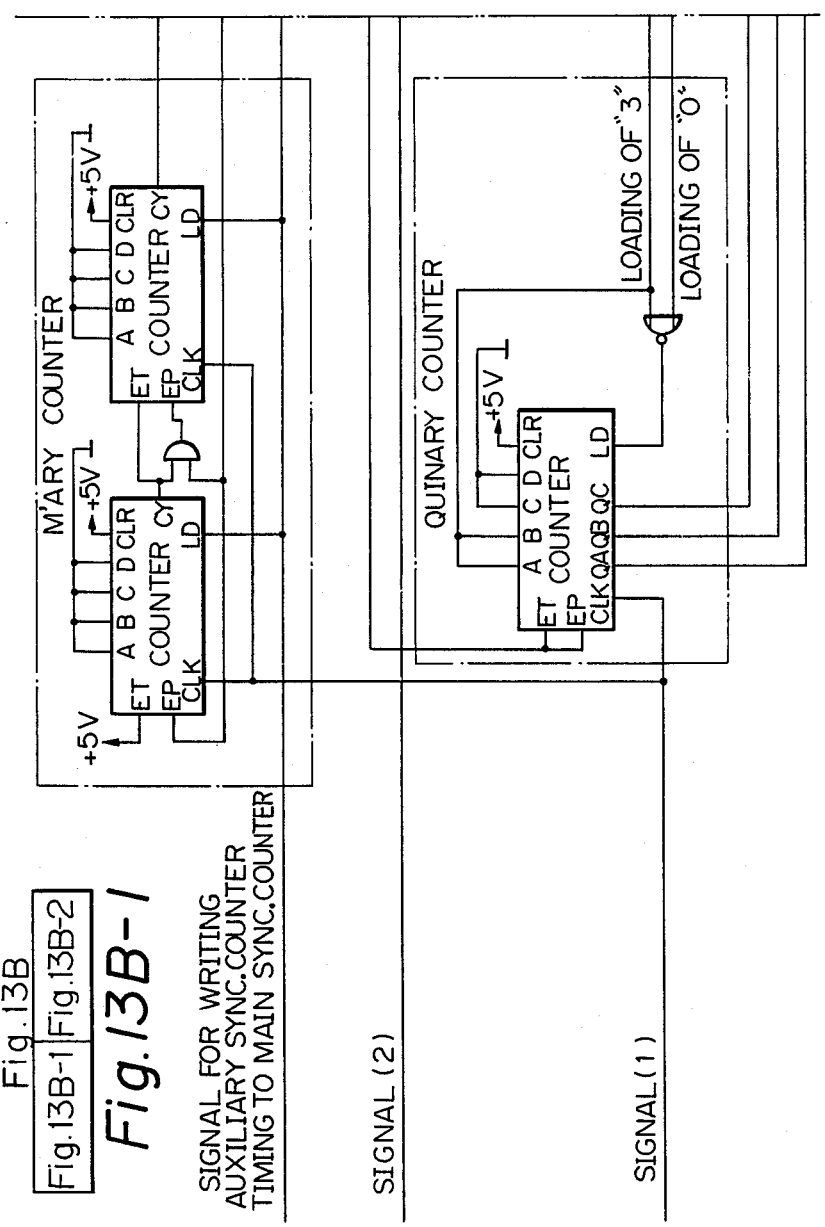

STATE TRANSITION DIAGRAM
3 STEPS OF PRE-PROTECTION
SWITCHABLE 2STEPS/3 STEPS OF POST-PROTECTION

DIGITAL SIGNAL TRANSMISSION SYSTEM HAVING FRAME SYNCHRONIZATION OPERATION

BACKGROUND OF THE INVENTION

1. Field of the Invention

The present invention relates to a digital signal transmission system having frame synchronization operation. The system according to the present invention is used, for example, for PCM telecommunication.

2. Description of the Related Arts

In general, in the receiver in a PCM telecommunication system, the received PCM signal is converted into parallel signals in a shift register, and the parallel converted signals from the shift register are supplied to a synchronization detection portion to produce a synchronization detection pulse indicating the existence of a synchronization pattern. The produced synchronization detection pulse is supplied to a synchronization protection portion having a main synchronization counter and a auxiliary (or sub-) synchronization counter to determine the synchronization state and carry out a predetermined protection.

In the operation of the synchronization protection portion, the number of sequences of preprotection (asynchronization confirmation) which give the criteria for the determination of asynchronization and the number of sequences of post-protection (synchronization recovery confirmation) which give the criteria for the determination of a synchronization recovery are selected with regard to the main synchronization counter and the auxiliary synchronization counter.

In the prior art, however, since the post-protection sequence number is usually selected to be the same for both the main synchronization counter and the auxiliary synchronization counter, sometimes an erroneous operation occurs in a pseudo synchronization detection portion in parallel with the synchronization detection portion if, for example, the error rate of the received PCM signal has deteriorated. Accordingly, a problem arises in that the timing from the auxiliary synchronization counter in a pseudo synchronization state is written into the main synchronization counter in the true synchronization state to bring the main synchronization counter to a pseudo synchronization state (simulated frame alignment state), and therefore, a stable frame synchronization cannot be established.

SUMMARY OF THE INVENTION

It is an object of the present invention to provide an improved digital signal transmission system having a frame synchronization operation in which the probability of erroneous operation due to deterioration of the error rate of the received PCM signal is reduced and the establishment of the stable frame synchronization is ensured.

In accordance with the present invention, there is provided a digital signal transmission system having a frame synchronization operation for transmitting frame synchronization patterns at a predetermined cyclic period. This system includes a synchronization pattern detection circuit for detecting a synchronization pattern in response to receipt of a transmitted digital signal; a pseudo synchronization detection circuit for detecting a pseudo synchronization pattern in the form of error detection code in response to receipt of a transmitted digital signal; and a synchronization protection circuit for counting the synchronization pattern detection signals produced when synchronization patterns are detected in response to a synchronization pattern detection signal from the synchronization pattern detection circuit. The synchronization protection circuit includes a main synchronization counter circuit and an auxiliary synchronization counter circuit, and count of protection steps for the confirmation of synchronization recovery of the auxiliary synchronization counter circuit in accordance with a synchronization or asynchronization of the main synchronization counter circuit is made variable.

BRIEF DESCRIPTION OF THE DRAWINGS

In the drawings:

FIG. 9 shows the waveforms of the signals appearing in the auxiliary synchronization counter of FIG. 8;

FIG. 10 shows the sequences of the states of the main and auxiliary synchronization counters in the digital signal transmission system having a frame synchronization operation according to an embodiment of the present invention;

FIGS. 12A, 12B, and 12C show an example of the flow chart of the operation of the auxiliary synchronization counter;

FIGS. 13A-1 and 13B-2 show the detailed structure of the auxiliary synchronization counter of FIG. 4;

FIGS. 13B-1 and 13B-2 show the detailed structure of the main synchronization counter of FIG. 4;

DESCRIPTION OF THE PREFERRED EMBODIMENTS

Figure 1:
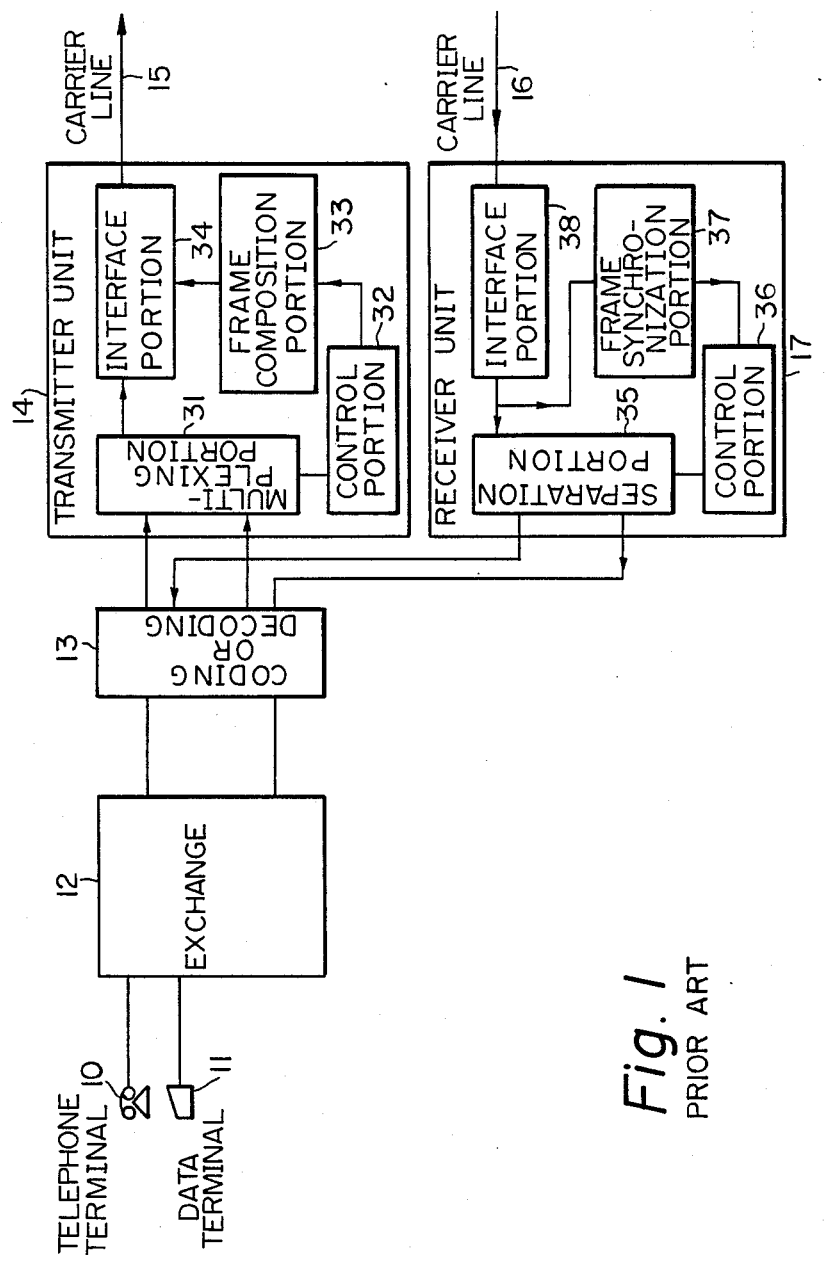
FIG. 1 shows the fundamental constitution of a digital signal transmission system having a frame synchronization operation to which the present invention is to be applied.

Before entering the description of a preferred embodiment, a prior art digital signal transmission system having a frame synchronization operation is described below with reference to FIGS. 1 to 7. A digital signal transmission system shown in FIG. 1 is constructed from a telephone terminal 10, a data terminal 11, an exchange unit 12, a coding/decoding unit 13, a transmitter unit 14, a carrier transmission line to another station 15, a carrier transmission line 16 from the another station, and a receiver unit 17.

The transmitter unit 14 includes a multiplexer portion 31, a control portion 32, a frame composition portion 33, and an interface portion 34 for the carrier transmission line 15. The receiver unit includes a separation portion 35, a control portion 36, a frame synchronization portion 37, and an interface portion 38 for the carrier transmission line 16.

Figure 2:
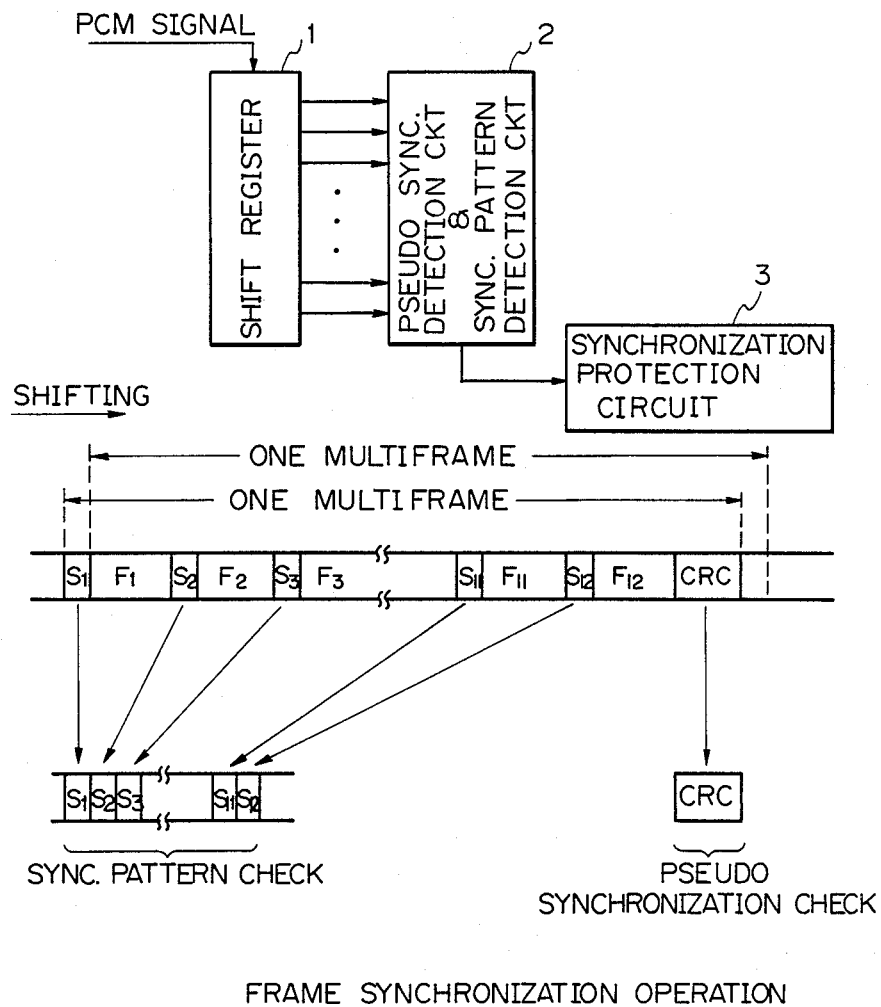
FIG. 2 shows a sequence of signals including synchronization patterns and a cyclic redundancy check code in the operation of a frame synchronization circuit in the system of FIG. 1.

FIG. 2 shows the arrangement of the frame synchronization portion 37 including a shift register 1, a synchronization pattern detection circuit (including pseudo synchronization detection circuit) 2, and a synchronization protection circuit 3, and a sequence of signals including synchronization patterns and a cyclic redundancy check code as an example of error detection code in the operation of a frame synchronization circuit in the system of FIG. 1. One multiframe of the received signal consists of a plurality of synchronization patterns: $S_1$, $S_2$, $S_3$ ... $S_{12}$, a plurality of frames for data $F_1$, $F_2$, $F_3$, ... $F_{12}$, and a cyclic redundancy check code CRC.

Figure 3:
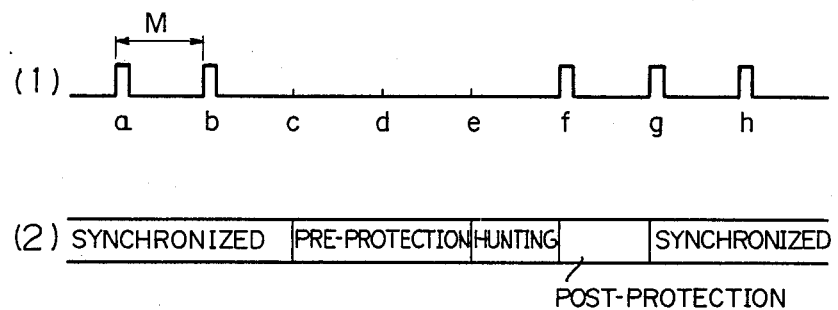
FIG. 3 shows an example of a sequence of the synchronized, the pre-protection, the hunting, and the post-protection states in the operation of a frame synchronization circuit.

FIG. 3 shows the state (2) of frame synchronization circuit as a sequence of a first synchronized state, a pre-protection period, a hunting period, a post-protection period, and a second synchronized state in correspondence with a sequence of synchronization pattern detection pulses (1).

Figure 4:
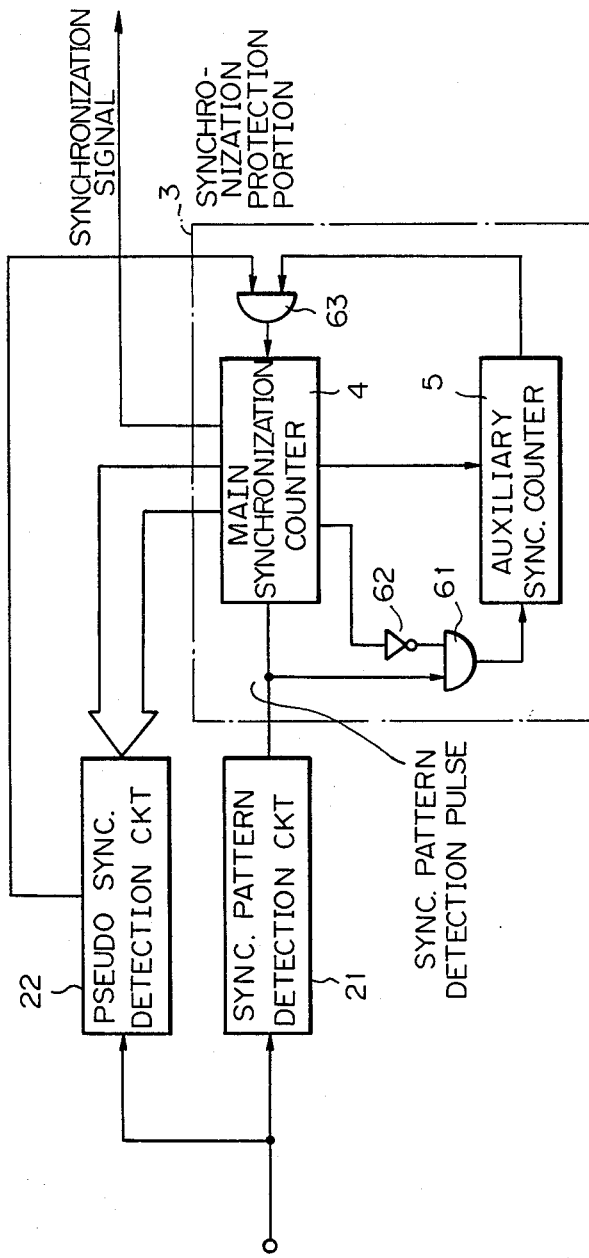
FIG. 4 shows the structure of a frame synchronization circuit to which the present invention is to be applied.

As shown in FIG. 4, the synchronization pattern detection portion and the synchronization protection portion provide a synchronization pattern detection circuit 21, a pseudo synchronization detection circuit 22, a main synchronization counter 4, a auxiliary synchronization counter 5, and an inverter 62 and AND gates 61 and 63.

In the circuit of FIG. 4, the synchronization pattern detection pulse from the synchronization pattern detection circuit 21 is supplied to the main synchronization counter 4 and the AND gate 61. The pseudo synchronization detection circuit 22 is driven with the timing of the main synchronization counter 4. The pseudo synchronization detection circuit includes a cyclic redundancy check code calculation member, a comparator member, and a decision member.

In the pseudo synchronization detection circuit, a value is obtained by applying, for example, M bits of the input PCM signal to a predetermined equation, and a value is obtained at the transmitter side of the opposite device in a similar manner. The comparison between the former obtained value and the latter obtained value is then carried out. In the result of this comparison, if the number of inconsistences is "6" from "10", a pseudo synchronization state is detected, and the main synchronization counter causes the output of the pseudo synchronization detection circuit 22 to be supplied to the AND gate 63. Since a timing signal of the auxiliary synchronization counter has been supplied to the AND gate 63, the timing signal of the auxiliary synchronization counter 5 is written into the main synchronization counter 4 so that the main synchronization counter 4 is changed from the pseudo synchronization state to the synchronization state.

Hence, the pseudo synchronization detection circuit 22 commences the operation with a new timing, and again determines whether or not the next synchronization is the true synchronization. It should be noted that the auxiliary synchronization counter 5 is prevented from being in synchronization with the main synchronization counter 4 by the AND gate 61.

Figure 5:
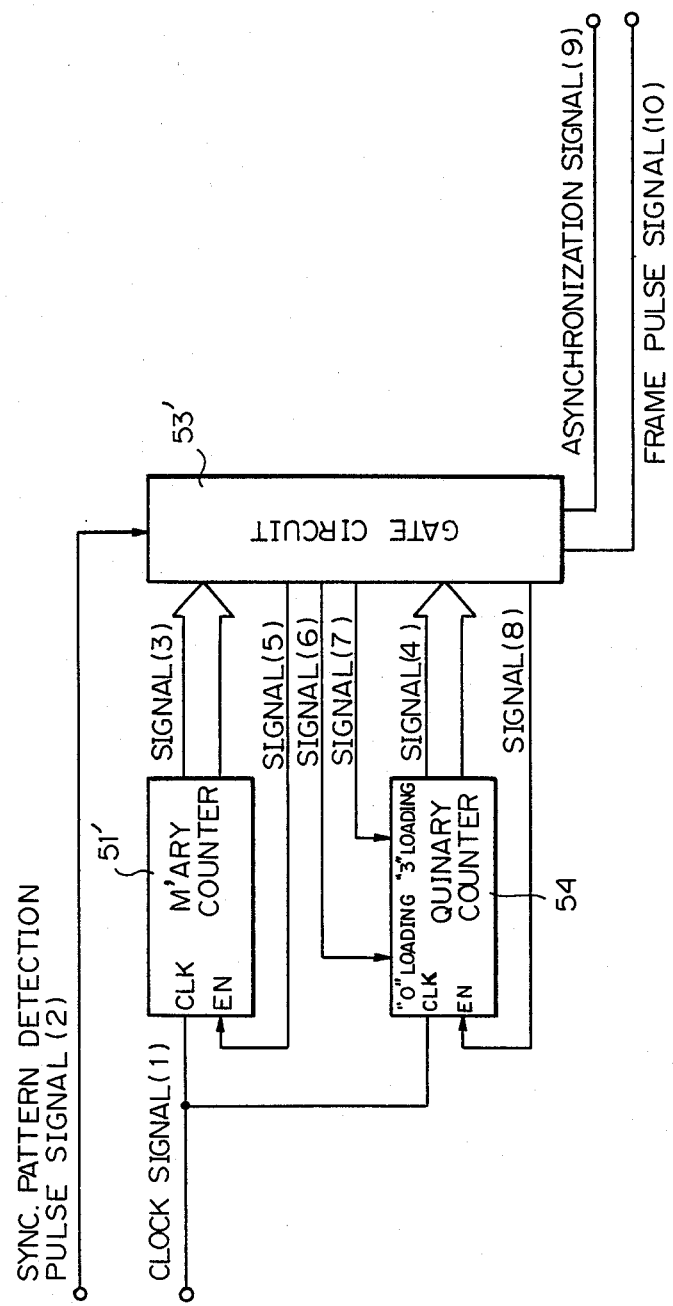
FIG. 5 shows a prior art auxiliary synchronization counter used in a prior art digital signal transmission system having a frame synchronization operation.
Figure 6:
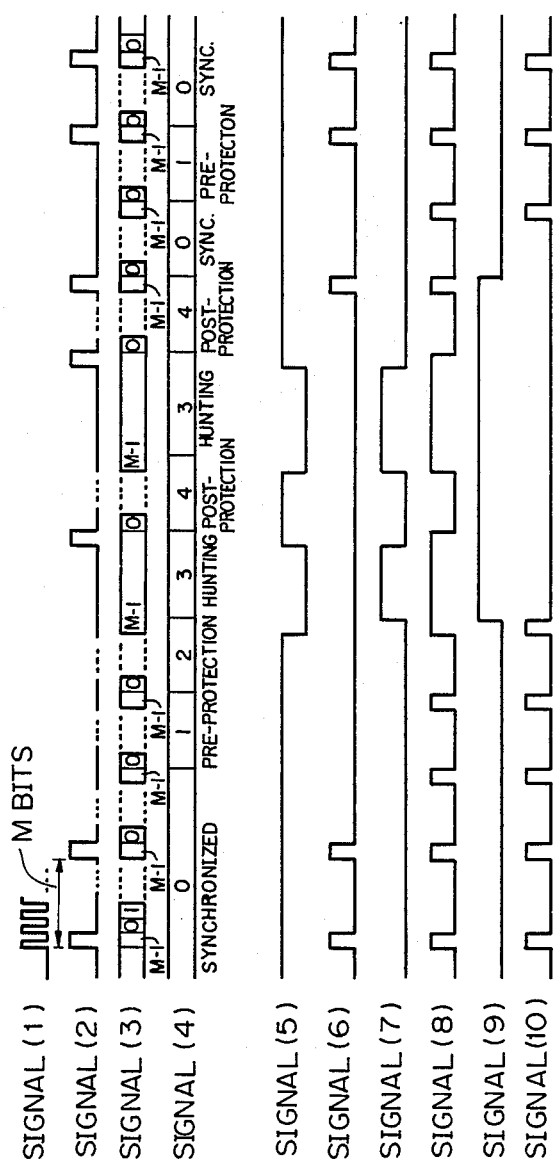
FIG. 6 shows the waveforms of the signals appearing in the auxiliary synchronization counter of FIG. 5.

As shown in FIG. 5, the auxiliary synchronization counter provides an M'ary counter 51', a quinary counter 54, and a gate circuit 53'. The operation of the auxiliary synchronization counter of FIG. 5 is explained with reference to the waveforms shown in FIG. 6, in which: signal (1) is a clock pulse; signal (2) is a synchronization pattern detection pulse; signal (3) is the output of the M'ary counter; signal (4) is the output of the quinary counter; signal (5) is an EN (enable) signal; signal (6) and signal (7) are loading control signals; signal (8) is an EN (enable) signal; signal (9) is an asynchronization signal; and, signal (10) is a frame pulse.

First, the signal (1) is supplied to the M'ary counter 51' and the quinary counter 54, and the signal (2) is supplied to the gate circuit 53'.

If the frame synchronization has been established, the signal (4) from the quinary counter becomes "0". Under this condition, if the signal (3) from the M'ary counter is "M−1" when the signal (2) is supplied to the gate circuit, the signal (4) from the quinary counter is maintained as "0". When the signal (2) is not supplied, the signal (4) from the quinary counter becomes "1" so that the auxiliary synchronization counter is brought to a pre-protection state.

When the synchronization pattern detection signal is not supplied more than 3 times sequentially, the signal (4) from the quinary counter becomes "3" so that the auxiliary synchronization counter is brought to a hunting state (search for frame alignment state). Under this condition, the signal (3) from the M'ary counter, which is the count of the M'ary counter, is fixed to "M−1".

In the hunting state of the auxiliary synchronization counter, when a synchronization pattern detection signal (2) is supplied, the signal (3) from the M'ary counter becomes "0", and the signal (4) from the quinary counter becomes "4" so that the auxiliary synchronization counter is brought to the post-protection state.

In the state where the signal (4) from the quinary counter is "4", and the signal (3) from the M'ary counter is "M−1", when a synchronization pattern detection signal (2) is supplied, the signal (4) from the quinary counter becomes "0", and the signal (3) from the M'ary counter becomes "0" so that the auxiliary synchronization counter is brought to the synchronized state. When, however, the synchronization pattern signal (2) is not supplied, the signal (4) from the M'ary counter becomes "3" so that the auxiliary synchronization counter is brought to the hunting state.

Due to the operations of the M'ary counter and the quinary counter, the gate circuit receives the signals (2) to (4), and produces the signals (5) to (10), and the auxiliary synchronization counter carries out the following operations. That is, the M'ary counter carries out the counting-up operation by the signal (5), except during the hunting state. The quinary counter is controlled to make the count to be always "0" in the synchronized state by the signal (6) and always "3" in the hunting state by the signal (7), and is counted-up only when the signal (3) from the M'ary counter is made "M−1" by the signal (8). The asynchronization signal (9) is produced when the count of the quinary counter is "3" or "4". The frame pulse signal (10) is produced when the signal (3) from the M'ary counter is "M−1" and the signal (4) from the quinary counter is "0" to "2".

Figure 7:
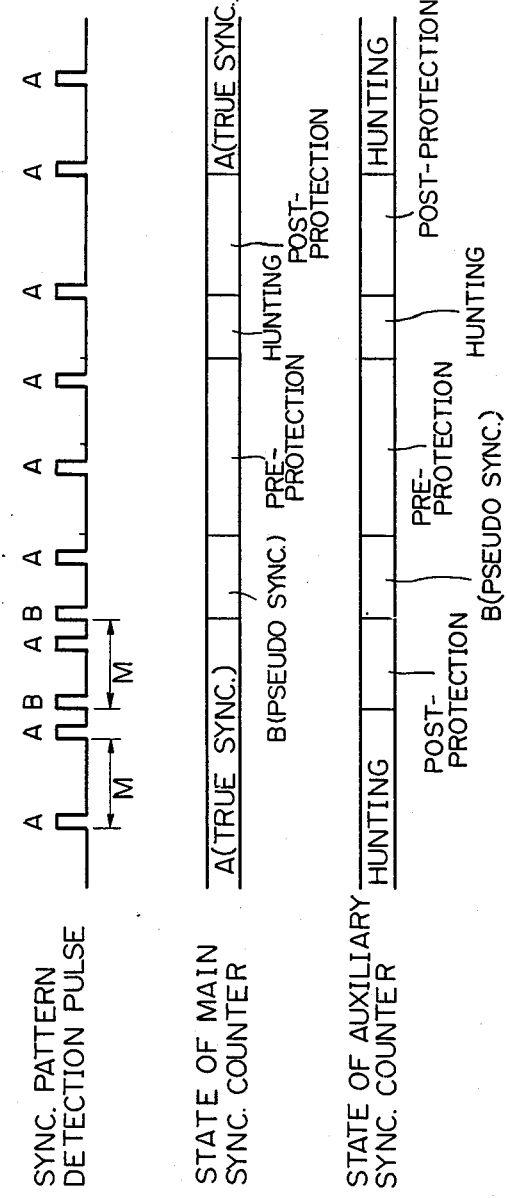
FIG. 7 shows the sequences of the states of the main and auxiliary synchronization counters in the frame synchronization circuit of FIG. 4.

The sequences of the states of the main and the auxiliary synchronization counters in correspondence with the sequence of the synchronization pattern detection signal are illustrated in FIG. 7. The number of steps of pre-protection of the main and the auxiliary synchronization counters is selected to be 3 steps. The number of steps of post-protection of the main and the auxiliary synchronization counters is fixed at 2 steps.

The manner of operation of the synchronization pattern detection portion and the synchronization protection portion shown in FIG. 4 when the error rate of the received input signal has deteriorated will now be explained.

It is assumed that the synchronization pattern detection pulses shown in the first row of FIG. 7 are delivered from the synchronization pattern detection circuit in FIG. 4. The pulses A are the synchronization pattern detection pulses obtained as the result of the detection of the true synchronization pattern. The pulses B are the synchronization pattern detection pulses obtained as the result of the detection of pseudo synchronization pattern existing in the received PCM signal. M represents the cycle period. The sequence of the states of the main synchronization counter is shown in the second row of FIG. 7. The sequence of the states of the auxiliary synchronization counter is shown in the third row of FIG. 7.

As shown in FIG. 7, the main synchronization counter is in synchronization with the synchronization pattern detection pulses A. That is, the main synchronization counter is in a true synchronization state with the synchronization pattern detection pulses A. To the contrary, the auxiliary synchronization counter is in the hunting state, as the synchronization pattern detection pulses A are not supplied because of the operation of the AND gate.

Upon detection of the pulse B, the auxiliary synchronization counter is brought to the post-protection state, and, after detecting two pulses B in sequence with a cyclic period of M, the auxiliary synchronization counter is brought to the synchronized state.

It is assumed that the error rate of the received input signal has deteriorated as described above. At this time, the main synchronization counter, which is in synchronization with the pulses A, is erroneously determined to be in the pseudo synchronization state, and the timing of the auxiliary synchronization counter is written into the main synchronization counter, and, accordingly, the main synchronization counter is brought to the pseudo synchronization state.

Since the main synchronization counter has become in synchronization with the pulses B, the pulses B are no longer supplied to the auxiliary synchronization counter, and the state of the auxiliary synchronization counter is changed from the pre-protection state of 3 steps to the hunting state. In the absence of the supply of the pulses B, the main synchronization counter is brought to the hunting state via the pre-protection state.

Then, both the main synchronization counter and the auxiliary synchronization counter detect the pulses A as the true synchronization pattern detection pulses. The main synchronization counter is brought to the synchronized state via the post-protection state. Since, however, the main synchronization counter has become in synchronization with the pulses A, the auxiliary synchronization counter is not supplied with the pulses A, and is brought again to the hunting state. Thus, where the error rate of the received input signal has deteriorated, erroneous operations of the synchronization pattern detection portion and the synchronization protection portion occur.

Figure 8:
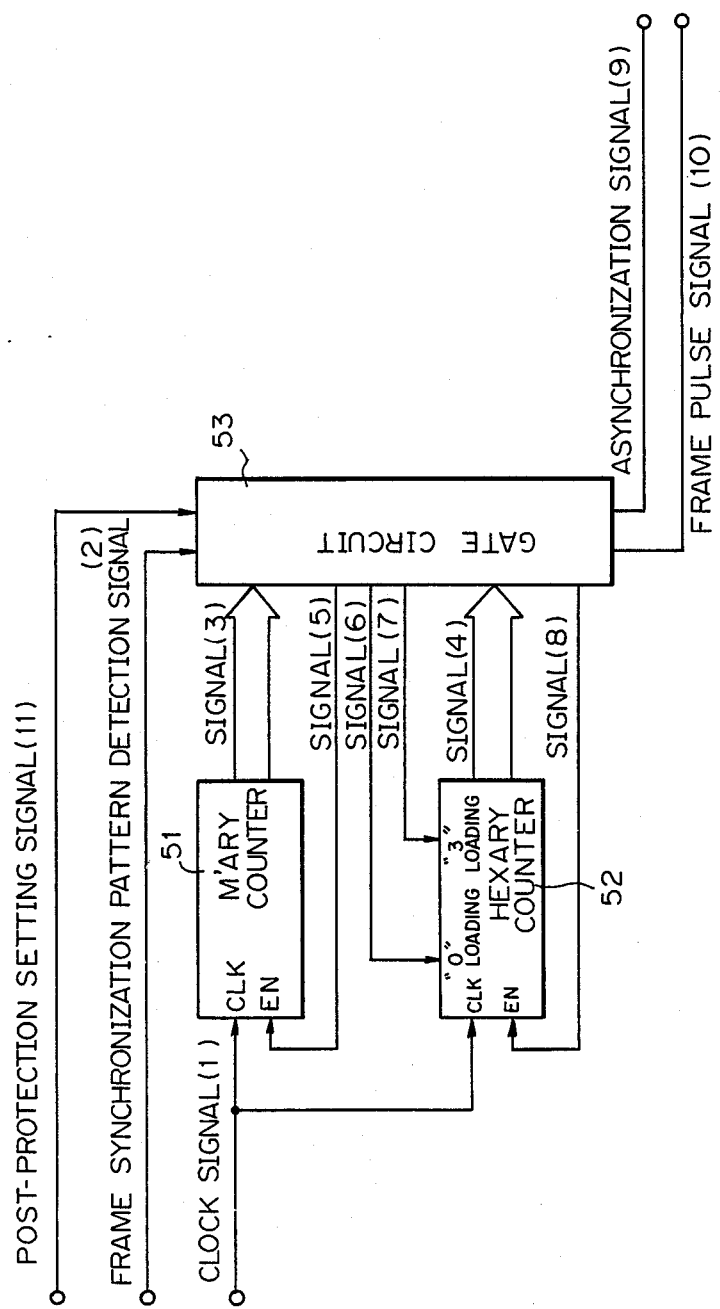
FIG. 8 shows the auxiliary synchronization counter used in the digital signal transmission system having a frame synchronization operation according to an embodiment of the present invention.

The structure of the auxiliary synchronization counter used in the digital signal transmission system having a frame synchronization operation according to an embodiment of the present invention is shown in FIG. 8. The auxiliary synchronization counter of FIG. 8 includes a M'ary counter 51, a hexary counter 52, and a gate circuit 53.

The M'ary counter 51 and the hexary counter 52 receive a signal (1) which is a clock signal. The gate circuit 53 receives a signal (11), which is the post-protection setting signal, and a signal (2) which is the synchronization pattern detection pulse. The M'ary counter 51 produces a signal (3) and the hexary counter 52 produces a signal (4).

The gate circuit produces a signal (9), which is the asynchronization signal, and a signal (10) which is the frame pulse.

The number of steps of post-protection of the auxiliary synchronization counter of FIG. 8 is arranged to be switchable between 2 steps and 3 steps.

The waveforms of the signals appearing in the auxiliary synchronization counter of FIG. 8 are shown in FIG. 9.

The operation of the auxiliary synchronization of FIG. 8 is as follows.

(i) When the frame synchronization has been established, the signal (4) of the hexary counter 52 is "0".

(ii) Under the condition that the signal (3) of the M'ary counter 51 is "M−1", when the signal (2) is supplied, the signal (4) from the hexary counter 52 is maintained as "0", and the synchronized state is maintained accordingly.

(iii) Under the condition that the signal (3) of the M'ary counter 51 is "M−1", when the signal (2) is not supplied, the signal (4) from the hexary counter 52 becomes "1", and the auxiliary synchronization counter is brought to the pre-protection state.

(iv) Under the condition that the signal (3) of the M'ary counter 51 is "M−1", when the absence of the signal (2) occurs three times in sequence, the signal (4) from the hexary counter 52 becomes "3", and the signal (3) from the M'ary counter is fixed to "M−1".

(v) In the hunting state, when the signal (2) is supplied, the signal (2) from the M'ary counter 51 becomes "0", the signal (4) of the hexary counter 52 becomes "4", and the auxiliary synchronization counter is brought to the post-protection state.

(vi) Under the condition that the signal (4) from the hexary counter 52 is "4", and the signal (3) of the M'ary counter 51 is "M−1", when the signal (2) is supplied, the signal (4) of the hexary counter 52 becomes "0" and the signal (3) of the M'ary counter 51 becomes "0", and the auxiliary synchronization counter is brought to the synchronized state if the signal (11) is "1" (number of steps of post-protection is "2").

(vii) Under the condition that the signal (4) from the hexary couter 52 is "4", and the signal (3) of the M'ary counter 51 is "M−1", when the signal (2) is supplied, the signal (4) of the hexary counter 52 becomes "5", and the post-protection state is maintained.

(viii) Subsequently, if the signal (2) is not supplied, the signal (4) from the hexary counter 52 becomes "3", and the auxiliary counter is brought again to the hunting state. If, however, a signal (2) is supplied, the signal (4) of the hexary counter 52 becomes "0", and the auxiliary synchronization counter is brought to the synchronized state.

The operation of the gate circuit 53 which receives the signal (2), the signal (3), the signal (4), and the signal (11) and produces the signal (5), the signal (6), the signal (7), the signal (8), the signal (9), and the signal (10) is as follows.

(i) The M'ary counter 51 carries out the counting up by the signal (5) of EN, except for the hunting state.

(ii) The hexary counter 52 is controlled to become "0" by the signal (6) always in the synchronized state, and to become "3" by the signal (7) always in the hunting state.

(iii) The signal (9) showing asynchronization is delivered when the signal (4) from the hexary counter 52 is "3", "4", or "5".

(iv) The signal (10) of the frame pulse is delivered when the signal (3) of the M'ary counter is "M−1" and the signal (4) of the hexary counter 52 is "0", "1", or "2".

(v) When the signal (4) of the hexary counter 52 is "4", the signal (3) of the M'ary counter 51 is "M−1", the signal (2) is "1", and the signal (11) of post protection setting signal is "0", the signal (4) from the hexary counter 52 is changed from "4" to "5".

(vi) When the signal (4) of the hexary counter 52 is "4", the signal (3) of the M'ary counter 51 is "M−1", the signal (2) is "1", an the signal (11) of the post-protection setting signal is "1", the signal (4) from the hexary counter 52 is changed from "4" to "0". Thus, the hexary counter 52 is controlled by the post-protection setting signal.

The sequences of the states of the main synchronization counter and the auxiliary synchronization counter in correspondence with the synchronization pattern detection pulses are shown in FIG. 10. In FIG. 10, the synchronization pattern detection pulses are shown in the first row, the state of the main synchronization counter is shown in the second row, and the state of the auxiliary synchronization counter is shown in the third row.

FIG. 10 illustrates the following operations of the main synchronization counter and the auxiliary synchronization counter.

That is, since the main synchronization counter is in synchronization with the pulses A, the auxiliary synchronization counter is in the hunting state and detects the supplied pulse B. However, since only two pulses B are supplied in sequence the post-protection is not terminated, so that the auxiliary synchronization counter is brought again to the hunting state.

Since the main synchronization counter is in synchronization with the pulses A, the auxiliary synchronization counter cannot operate with the timing of A and assumes the post-protection state and the hunting state alternately, so that the probability of being brought to the synchronized state is low.

Since the probability of being brought to the synchronized state for the auxiliary synchronization counter is low, the probability of maintenance of the synchronized state for the main synchronization counter is high.

In this connection, in the circuit where the auxiliary synchronization counter is operated only when the pseudo synchronization is detected with the timing of the main synchronization counter as shown in FIG. 4, the pseudo synchronization is prevented from occurring by making the number of steps of the post-protection of the auxiliary synchronization counter, which correspond to the time length of the post-protection of the auxiliary synchronization counter, larger than the number of steps of the post-protection of the main synchronization counter.

Figure 11A:
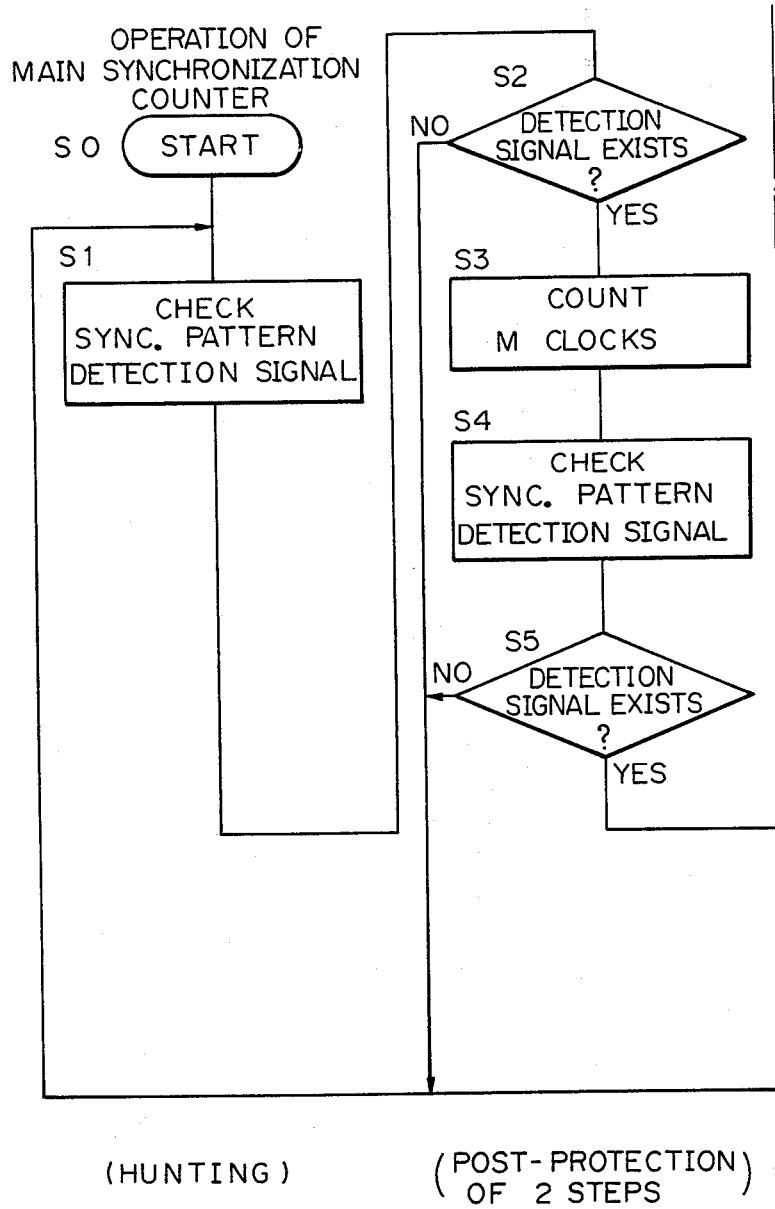
FIGS. 11A and 11B show an example of the flow chart of the operation of the main synchronization counter.
Figure 11B:
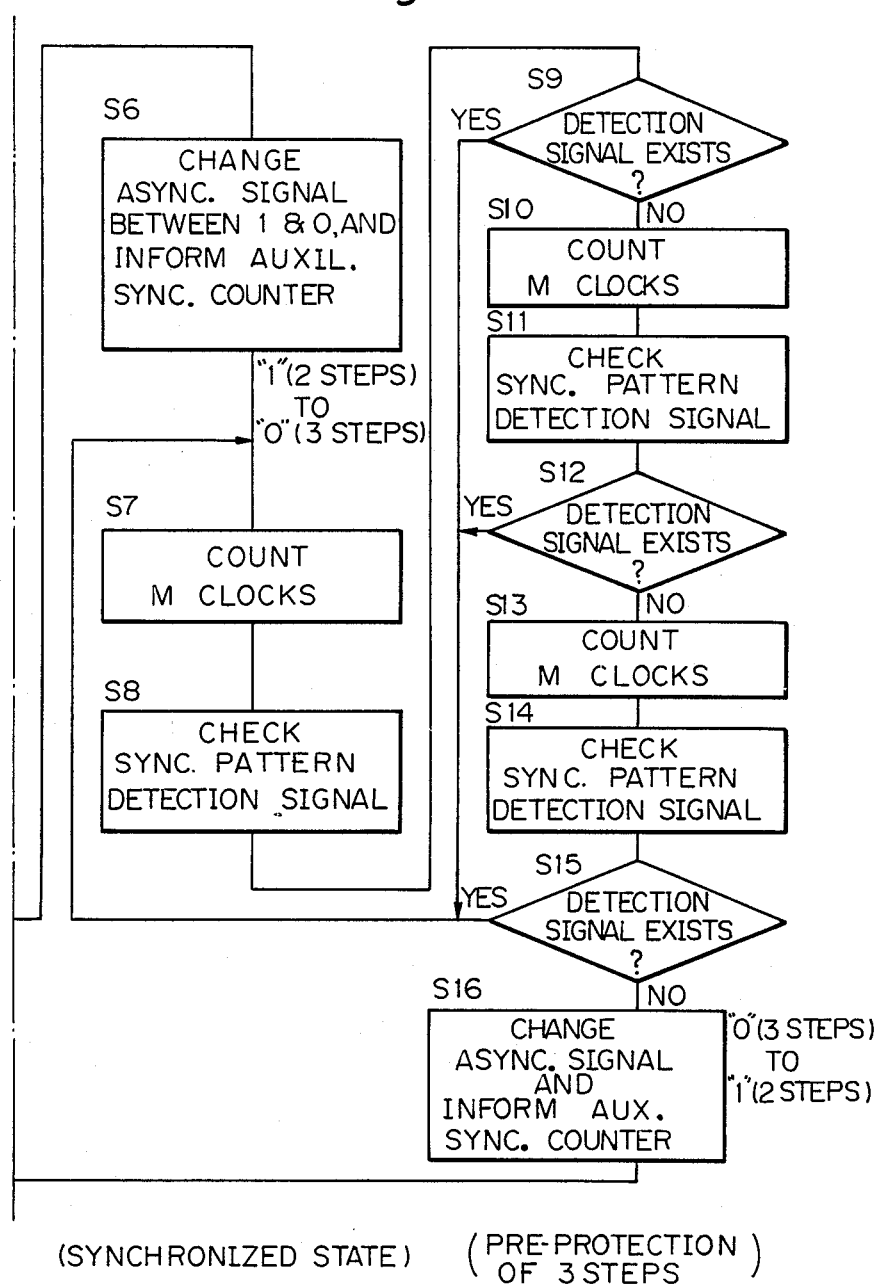

A flow chart of the operation of the main synchronization counter having 3 pre-protection steps and 2 post-protection steps is shown in FIG. 11. The flow includes stages S0 to S16. The stages S0 and S1 are the hunting stage; the stages S2 to S5 are the post-protection of 2 steps; the stages S6 to S8 are the synchronized state; and, the stages S9 to S16 are the pre-protection of 3 steps.

Figure 12B:
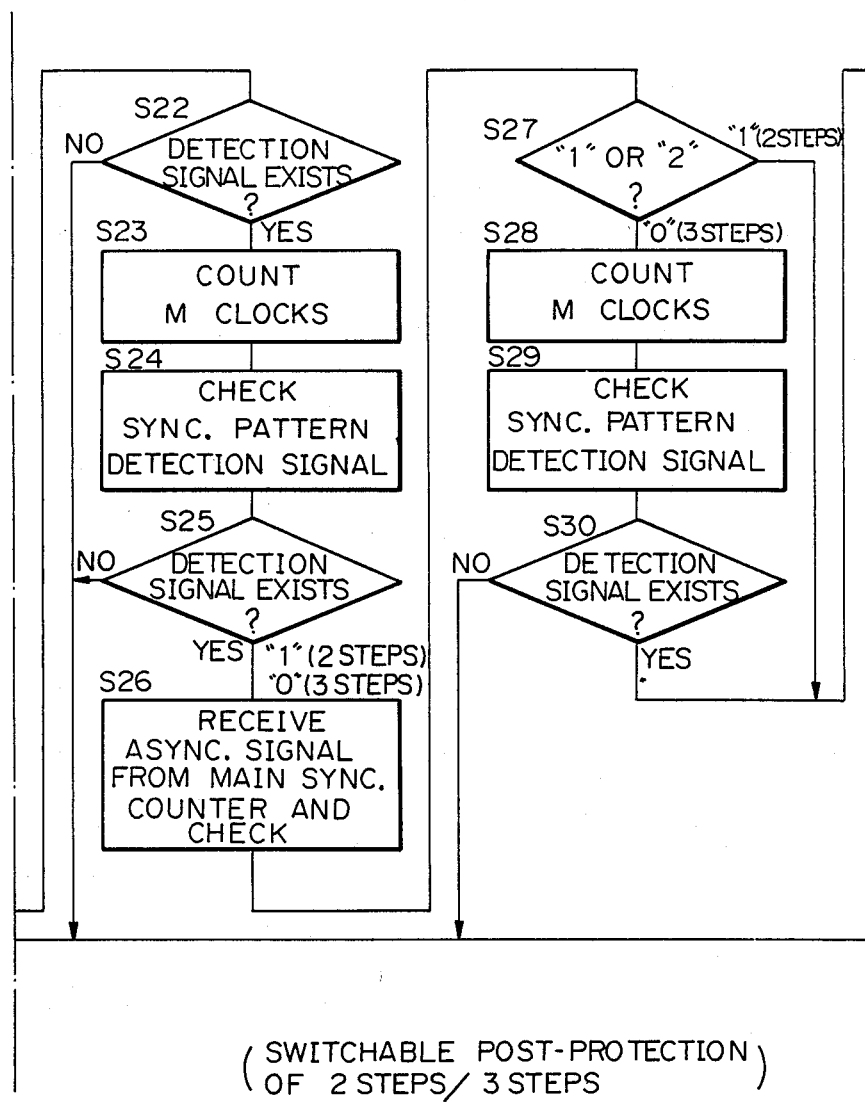
Figure 12C:
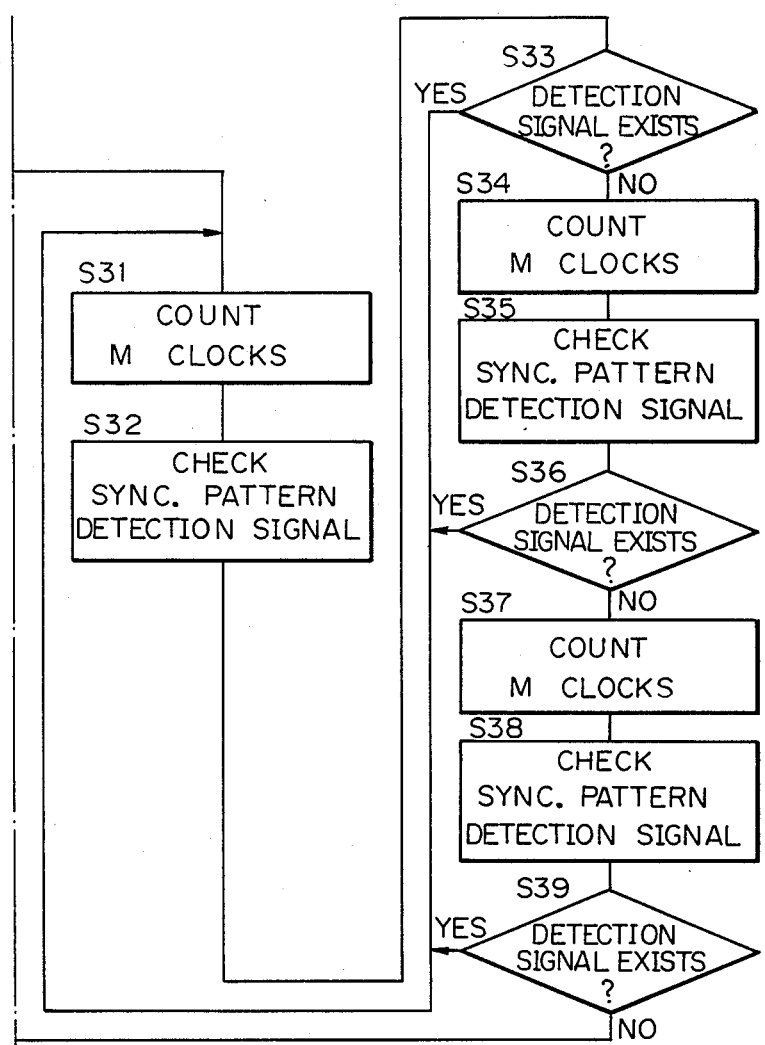

A flow chart of the operation of the auxiliary synchronization counter having 3 pre-protection steps and the variable 2 or 3 post-protection steps is shown in FIG. 12. The flow includes stages S20 to S39. The stages S20 and S21 are the hunting state; the stages S22 to S30 are the variable post-protection of 2 steps or 3 steps; the stages S31 and S32 are the synchronized state; and the stages S33 to S39 are the pre-protection of 3 steps.

Figures 1, 13A:
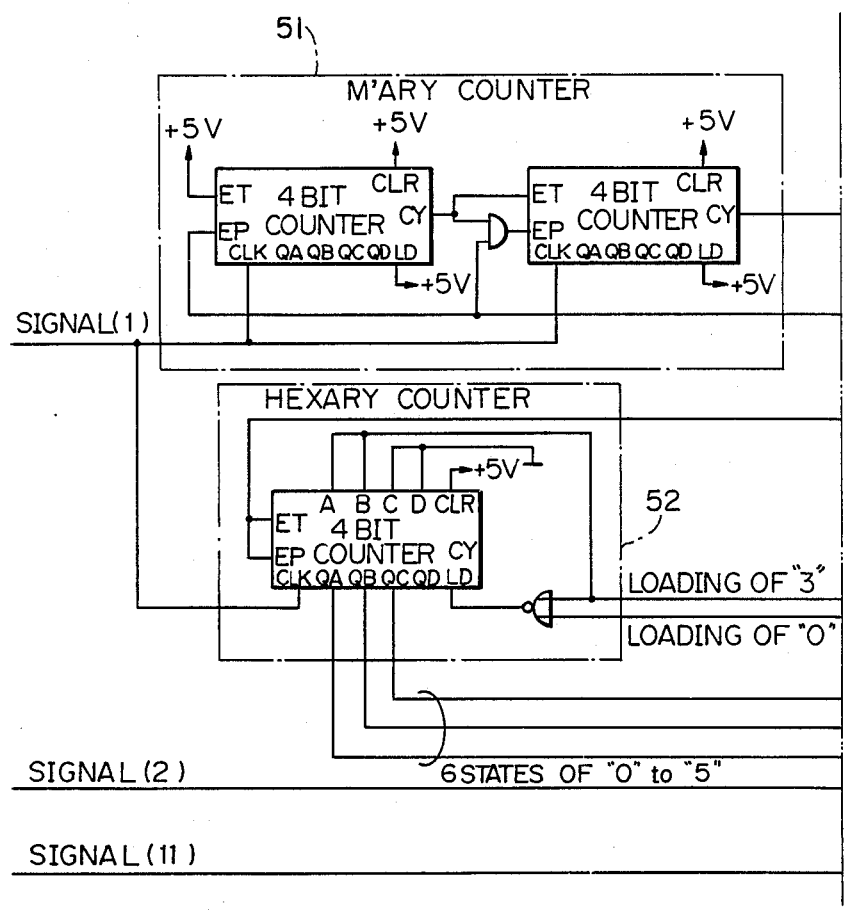

An example of the detailed structure of the auxiliary synchronization counter of FIG. 8 is shown in FIG. 13A. A detailed structures of the M'ary counter, the hexary counter, and the gate circuit are shown. As a simple example, the number M is assumed to be "256" in FIG. 13A.

Figures 2, 13A:
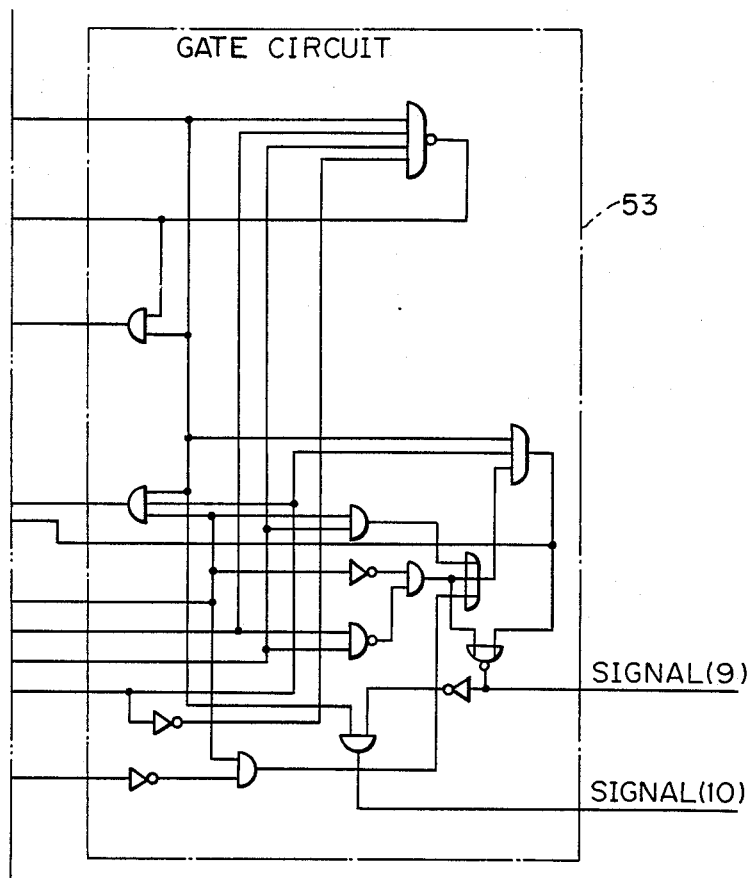
Figures 2, 13B:
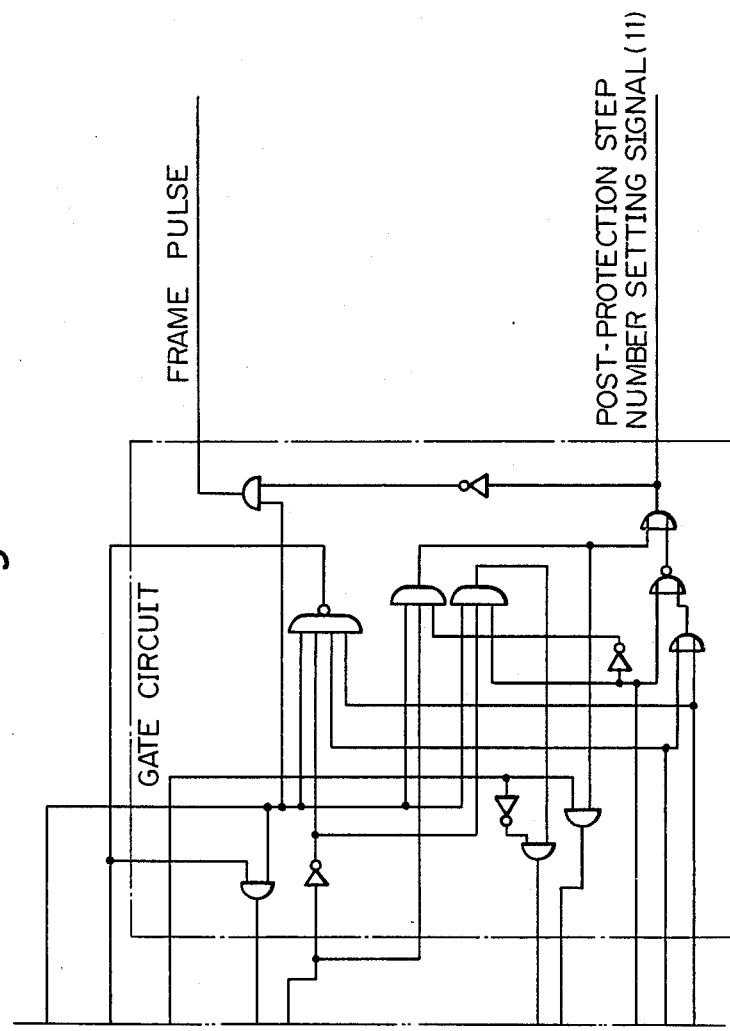

An example of the detailed structure of the main synchronization counter of FIG. 4 is shown in FIG. 13B.

Figure 14:
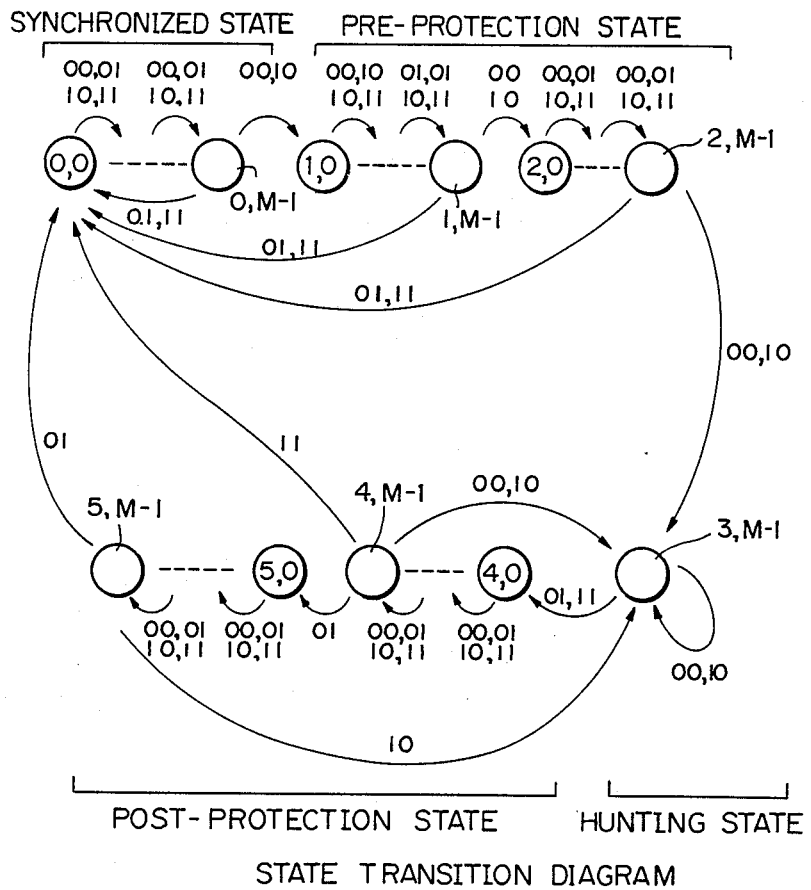
FIG. 14 shows the state transition diagram of the auxiliary synchronization counter of FIG. 8.

A state transition diagram of the auxiliary synchronization counter of FIG. 8 is shown in FIG. 14. It is assumed that the pre-protection steps are 3 steps, and the post-protection steps are switchable to 2 steps or 3 steps. In FIG. 13, the numeral pairs in the circles represent the states. The first numeral represents the contents of hexary counter, and the second numeral represents the contents of M'ary counter. Namely, "0, 0" to "0, M−1" is the synchronized state; "1, 0" to "2, M−1" is the pre-protection state; "3, M−1" is the hunting state; and "4, 0" to "5, M−1" is the post protection state. In numeral pairs outside the circles, the first numeral represents the post-protection setting signal where "0" represents the 3 steps while "1" represents the 2 steps, and the second numeral represents the existence of the synchronization pattern detection pulse where "0" represents the negative or non-existent while "1" represents the affirmative or existent.

It should be noted that the first numeral of each of the numeral pairs in FIG. 14 represents the post-protection setting signal where "0" represents 3 steps and "1" represents 2 steps, while the second numeral of each of numeral pairs represents the state of the synchronization pattern detection pulse where "0" represents the "non-existent" and "1" represents the "existent".

Figure 15:
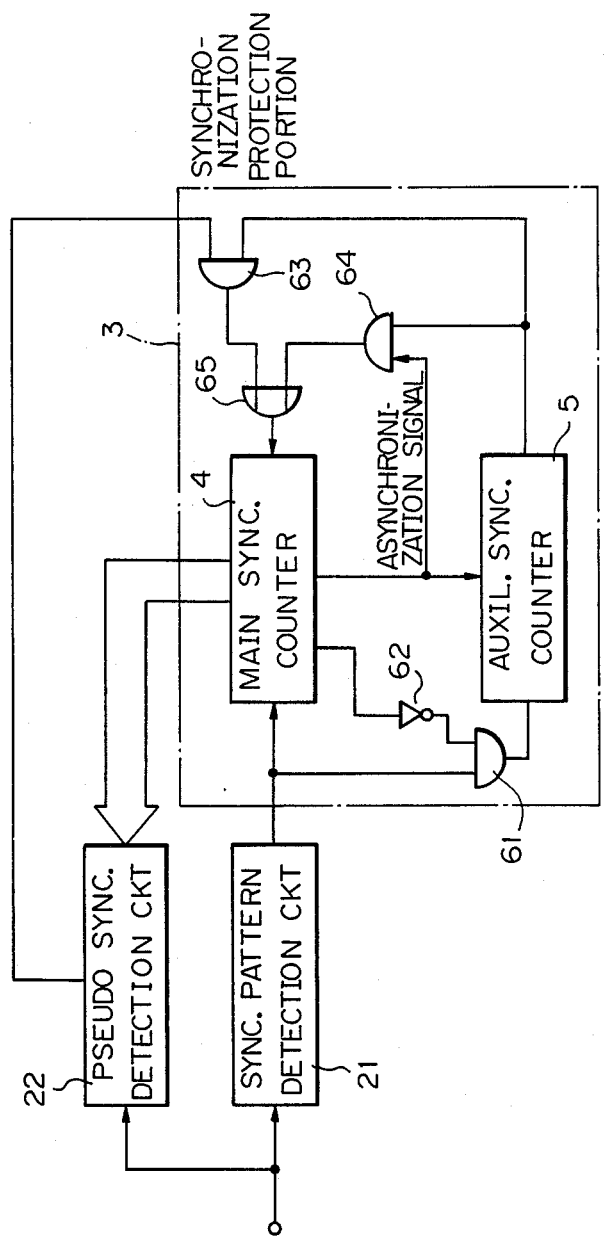
FIG. 15 shows a modified structure of a frame synchronization circuit to which the present invention is to be applied.

A modified structure of a frame synchronization circuit to which the present invention is to be applied is shown in FIG. 15. In the circuit of FIG. 15, an AND gate 64 which asynchronization signal from the main synchronization counter 4 and the output of the auxiliary synchronization counter 5, and an OR gate 65 which receives the output of the AND gate 64 and the output of AND gate 63 and supplies the output to the main synchronization counter 4 are added.

Figure 16:
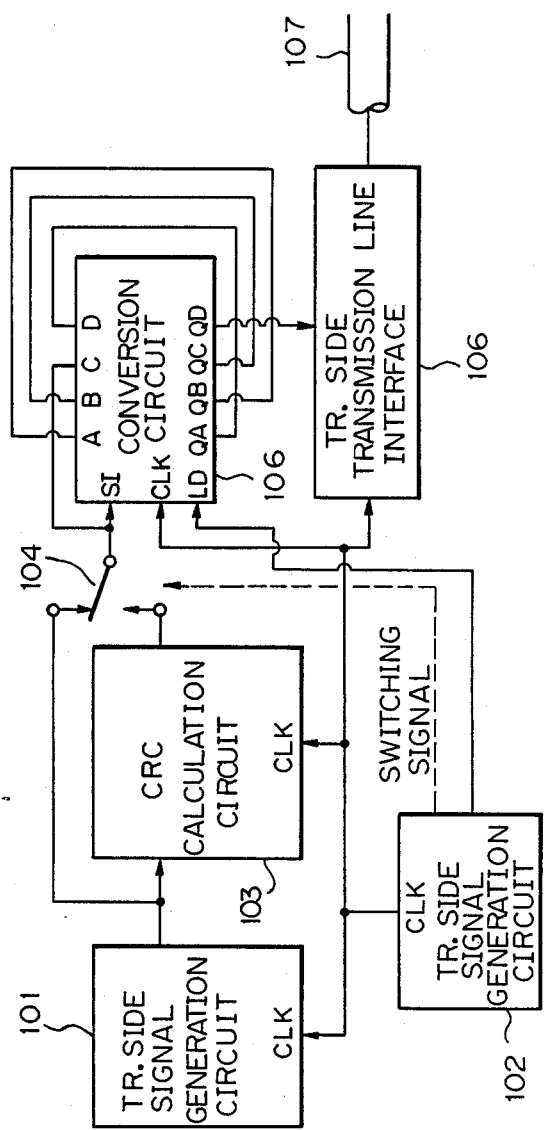
FIGS. 16 to 18 illustrate another embodiment of the present invention.
Figure 17:
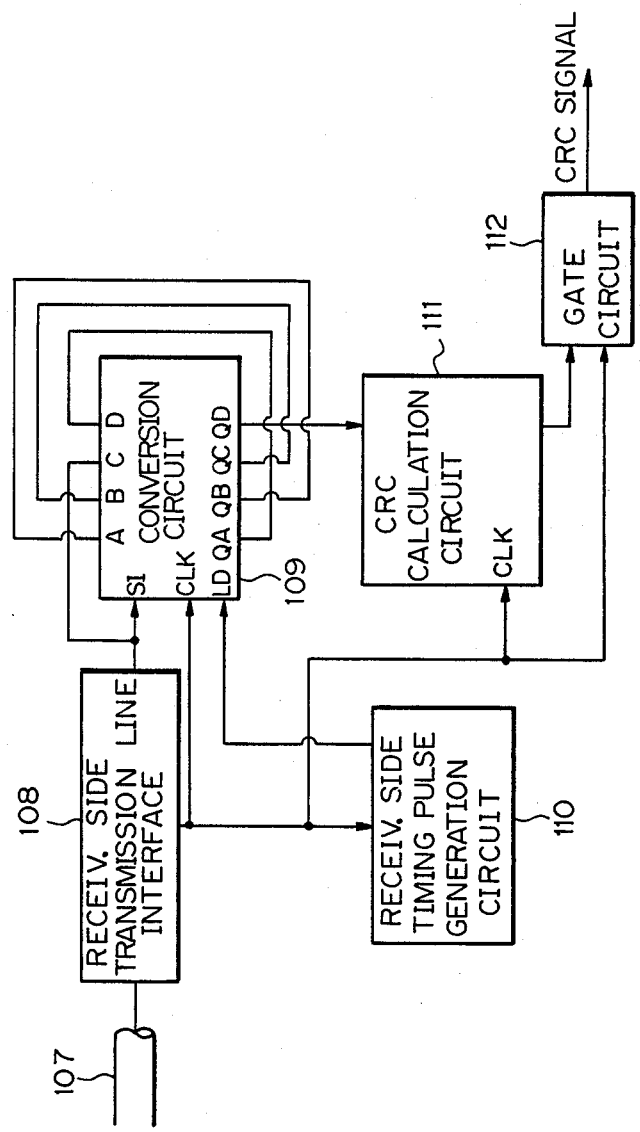
Figure 18:
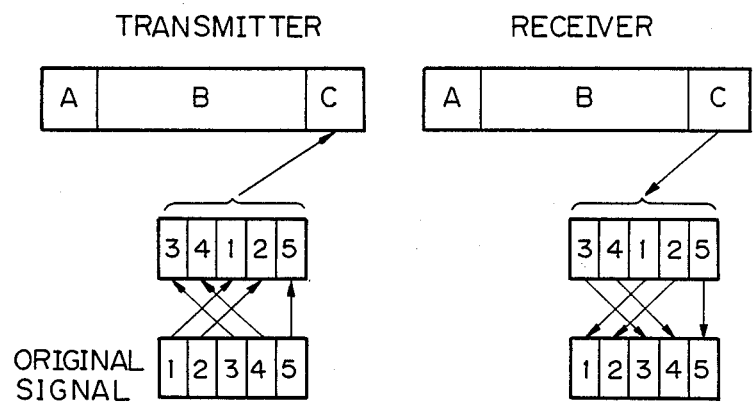
Figure 19:
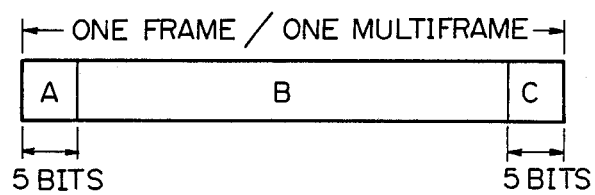
FIGS. 19 and 20 illustrate the corresponding prior art.
Figure 20:
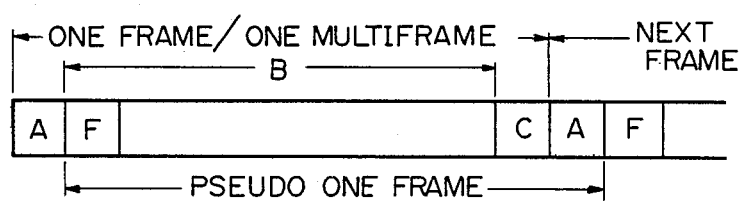

Concerning the pseudo synchronization detection circuit shown in FIGS. 2 and 4, another embodiment of the present invention is illustrated in FIGS. 16, 17, and 18 and a prior art is illustrated in FIGS. 19 and 20.

FIG. 18 shows the basic principle of this embodiment. One frame or one multiframe consists of A (frame sync pattern including data), B (data), and C (error detecting code). At the transmitting end, all bits (five bits in FIG. 18) of a cyclic redundancy check code C (error detection code) out of all bits constituting a frame are cleared to logic "0", and all frame bits are divided by a specific binary number G.

Assume that the remainder of the above division is "10110". In other words, the first bit is "1"; the second bit, "0"; the third bit, "1"; the fourth bit, "1"; and the fifth bit, "0".

In this embodiment, the order of the first bit to the fifth bit is changed, and the resultant data is sent out. For example, as shown in FIG. 18, the first bit is substituted with the third bit and vice versa, the second bit is substituted with the fourth bit and vice versa, and the fifth bit remains unchanged. Therefore, the remainder "10110" is changed to "11100". The result "11100" is set as the error detecting code, and the resultant frame data is transmitted.

At the receiving end, the first bit of the cyclic redundancy check code C is substituted with the third bit and vice versa, the second bit is substituted with the fourth bit and vice versa, and the fifth bit remains unchanged. The above division is then performed. If the division produces no remainder, the receiving end discriminates that no error has occurred. Otherwise, the receiving end discriminates that an error has occurred. In addition, pseudo synchronization can be established.

In the above embodiment, only an example of a change in the order of bits constituting the cyclic redundancy check code C is exemplified. Therefore, for example, the first bit may be shifted to the fifth bit position, the second bit may be shifted to the first bit position, the third bit may be shifted to the second bit position, the fourth bit may be shifted to the third bit position, and the fifth bit may be shifted to the fourth bit position. The bit order can be changed in still other manners.

The transmitting and receiving ends are respectively shown in FIGS. 16 and 17. Referring to FIGS. 16 and 17, reference numeral 101 denotes a transmitting-end signal generator; 102, a transmitting-end clock timing pulse generator; 103, a cyclic redundancy check code (CRC) calculation circuit; 104, a switch; 105, a converter; 106, a transmitting-end transmission line interface; 107, a transmission line; 108, a receiving-end transmission line interface; 109, a converter; 110, a sync and receiving-side timing pulse generator; 111, a CRC operation circuit; and 112, a gate circuit.

At the transmitting end, the converter 105 comprises a shift register. If a signal is not supplied to the LD terminal of the shift register, the input signal is output without modifications. However, if the signal is input to the LD terminal, the order of input pulses is changed, and the updated pulses are output.

The transmitting-end switch 104 is connected to the transmitting-end signal generation 101. In this state, no signal is applied to the LD terminal of the converter 105. An output signal B from the transmitting-end signal generator 101 is connected through the switch 104 and is not converted by the converter 105. The output from the converter 105 is sent onto the transmission line 107 through the transmitting-end transmission line interface 106.

The CRC calculation circuit 103 produces a cyclic redundancy check code to set the switch 104 to the side of the CRC calculation circuit 103. The cyclic redundancy check code is set in the C position, and the resultant frame data is sent to the converter 105.

Since the signal is supplied to the LD terminal of the converter 105, the bit order of the cyclic redundancy check code C is changed, and the resultant code is sent onto the transmission line 107 through the transmitting-end transmission line interface 106.

The signal sent via the transmission line 107 is received by the converter 109 through the receiving-side transmission line interface 108.

The converter 109 has the same arrangement as the converter 105. A signal is not input to the LD terminal of the converter 109 upon reception of the input signal B. The signal B is sent to the CRC operation circuit 111 without modification. However, if the input signal is the signal C, a signal is input to the LD terminal. The signal C is converted by the converter 109 to the original signal, and it is sent to the CRC operation circuit 111.

In this embodiment, substitution of the cyclic redundancy check code is performed at the transmitting end. The receiving end performs reverse substitution and the same arithmetic operation as that at the transmitting end. The substitution scheme can be achieved such that a Hamming distance to the original signal is not set to be constant. Therefore, even if a specific pseudo sync pattern is inserted in an initial time slot of the signal B, cyclic redundancy check codes do not coincide with each other.

In this embodiment, even if a specific pseudo sync pattern is inserted in an initial time slot of the signal B, a cyclic redundancy check code noncoincidence always occurs.

Figure 21:
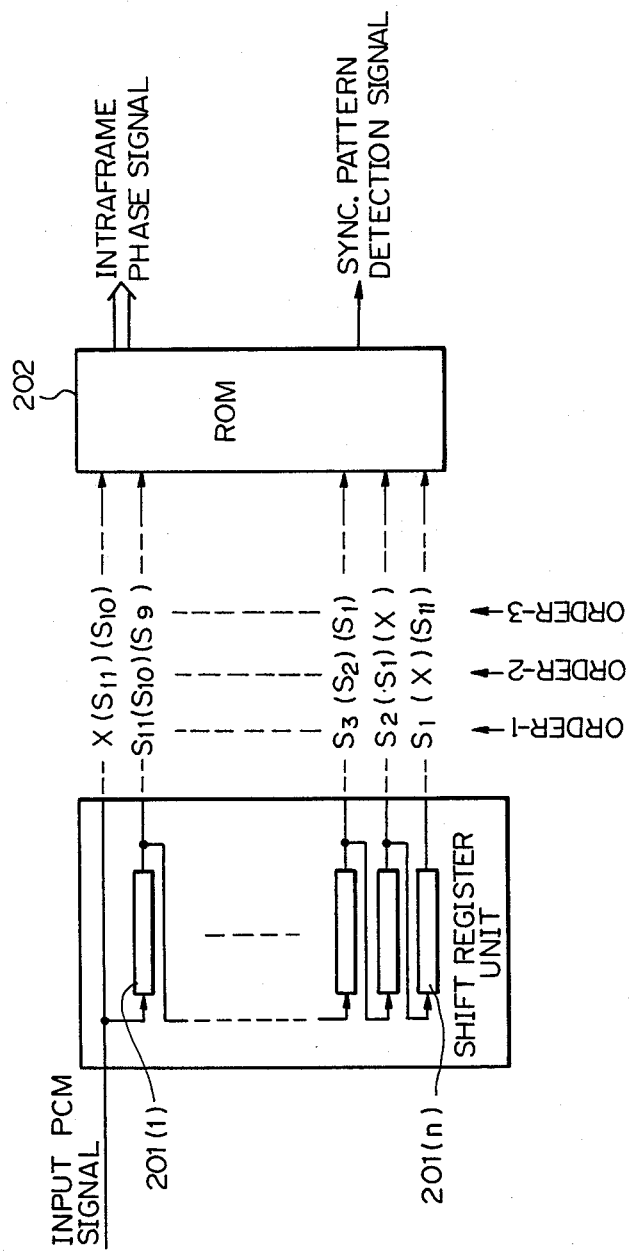
FIGS. 21 to 26 illustrate still another embodiment of the present invention.
Figure 22:
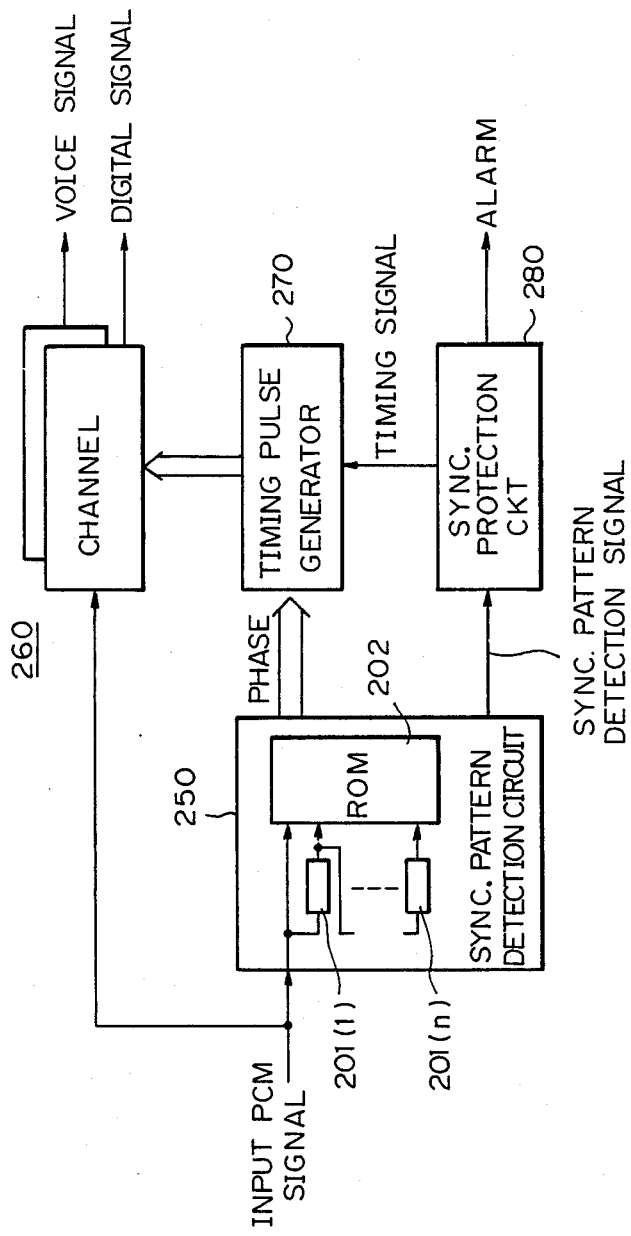
Figure 23:
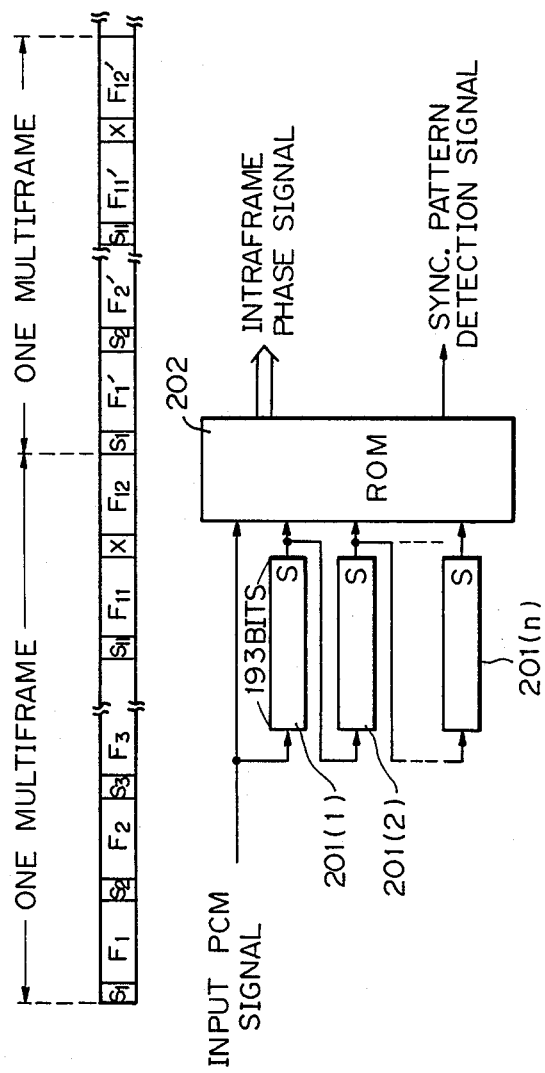

Concerning the synchronization pattern detection circuit shown in FIGS. 2 and 4, still another embodiment of the present invention is shown in FIGS. 21 to 26. In this embodiment, reference numeral 201 denotes a shift register section constituted by shift register functional elements 201($l$) to 201($n$); and 202, a frame sync pattern detector constituted by a read-only memory, ROM. A PCM communication system using the apparatus in FIG. 21 is shown in FIG. 22.

Referring to FIG. 22, reference numeral 250 denotes a sync pattern detector comprising shift register functional elements 201($l$) to 201($n$) and a frame sync pattern detector 202 constituted by a ROM. Referring numeral 260 denotes a channel circuit for generating a digital or audio signal; 270, a timing pulse generator; and 280, a sync protective circuit.

The shift register functional elements 201($l$) to 201($n$) sequentially shift input data so as to perform the same operation as the shift register. The elements 201($l$) to 201($n$) can be replaced with a shift register. However, since one frame has a length of 193 bits (=8 bits×24 CH+one sync bit S), use of a shift register results in an expensive arrangement. Therefore, a memory is subjected to address translation to constitute the shift register functional elements 201($l$) to 201($n$).

Assume that an address is input with sync bits $S_1$ to $S_{11}$, i.e., that an address signal in an order of sync bits $S_1$, $S_2$, $S_3$, ..., as indicated by ORDER-1 in FIG. 21 is input to the frame sync pattern detector 202 constituted by the ROM, that an address signal in an order of sync bits X, $S_1$, $S_2$, ... (the sync bit X serves as an alarm bit), as indicated by ORDER-2 is input thereto, or that an address signal in an order of sync bits $S_{11}$, X, $S_1$, ..., as indicated by ORDER-3 is input thereto. In this case, the frame sync pattern detector 202 generates a sync pattern detection signal. At the same time, the frame sync pattern detector 202 generates an intraframe phase signal (a signal of phase in frame) corresponding to the input address signal. More specifically, the intraframe phase signal represents 1 for ORDER-1, 2 for ORDER-2, ... Synchronization is restored, and the positions of a first frame F1, a second frame F2, ... can be detected. Therefore, complete synchronization is restored.

In the above arrangement, the frame sync pattern detector 202 comprises a ROM. However, inverters and NAND gates, or AND gates can be used in place of the ROM. In this case, the number of sets of inverters and NAND gates must be the same as the number of frame sync patterns. Therefore, twelve sets of inverters and NAND gates are required in the above arrangement. An intraframe phase can be detected by discriminating which NAND gate outputs the sync pattern detection signal.

In the ROM communication system of FIG. 22, if an asynchronous state occurs upon hunting, the shift register functional elements 201($l$) to 201($n$) in the sync pattern detector 250 and the frame sync pattern detector 202 immediately generate the sync pattern detection signal and the intraframe phase signal, thereby restoring the synchronous state.

The sync pattern detection signal is sent to the sync protective circuit 280, which supplies a timing signal to the timing pulse generator 270 in response thereto. Since the intraframe phase signal has been received by the timing pulse generator 270, it can detect which frame signal is sent to the channel circuit 260. A digital signal from a data terminal or the like is output as a digital signal. In the case of the audio signal, an analog audio signal converted by the channel circuit 260 is output. In this case, signalling is present in the sixth and 12th frames F6 and F12 so that these frame signals can be read out.

In the above embodiment, upon an input of sync bits into the frame sync pattern detector, these bits can be detected regardless of their order. At the same time, the intraframe phase signal representing one of patterns ($S_1$, $S_2$, ... $S_{11}$), ($S_2$, $S_3$, ... $S_{11}$, $S_1$), ($S_3$, ... $S_1$, $S_2$) ... is output according to the order of the input sync bits, thereby restoring synchronization within a short period of time.

Figure 24:
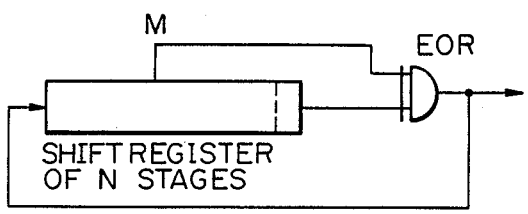
Figure 25:
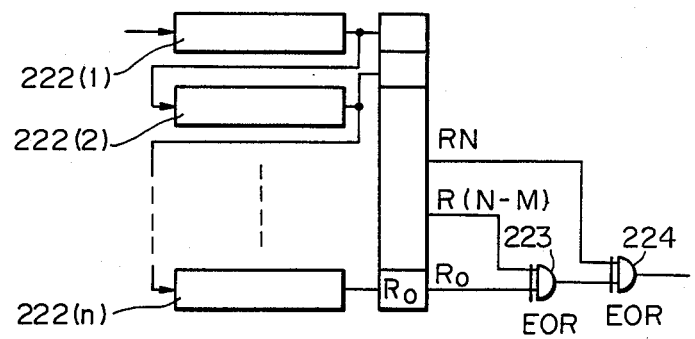
Figure 26:
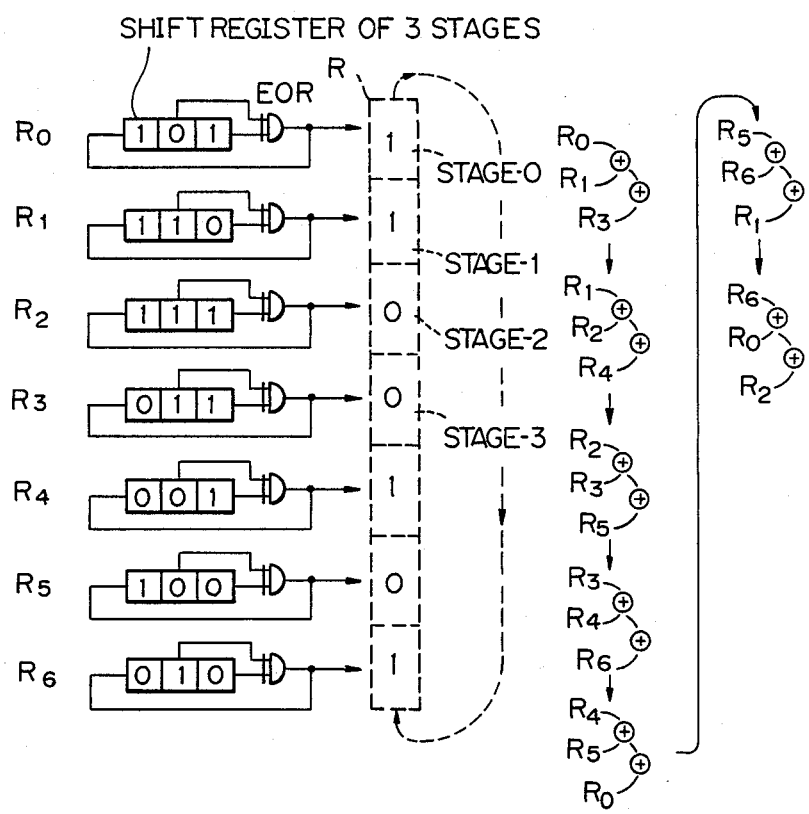

FIG. 24 shows a PN pattern (pseudo random pattern) generator, FIG. 25 shows a PN pattern detector, and FIG. 26 shows the basic principle of PN pattern detection.

Figure 27:
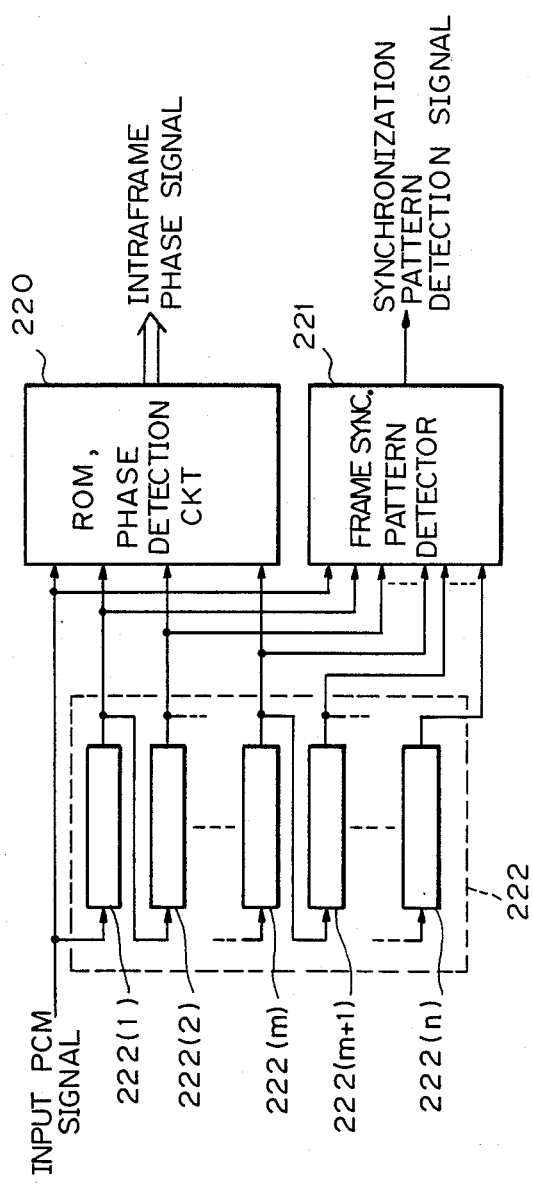
FIG. 27 illustrates still another embodiment of the present invention.

Still another embodiment of the present invention is shown in FIG. 27. In this embodiment, some of the sync bits are monitored to detect the sync pattern and the intraframe phase. The sync pattern is exemplified by a PN pattern. A PN pattern is obtained by an EOR gate for producing a logical EOR signal of an N-stage shift register output bit and an Mth-stage signal. The EOR signal is supplied to the shift register. If the number of stages of the shift register is N, the number of patterns in the shift register is $2^N - 1$, excluding all "0"s. The output signal from the EOR gate is repeatedly output as PN pattern having a length of $2^N - 1$) bits.

The PN pattern characteristics will be briefly described with reference to FIG. 26 when a 3-stage shift register is used. If data "101" is set in the 3-stage shift register, an EOR signal of the central and output stages is "1". If the data is sequentially shifted bit by bit, a 7-bit PN pattern shown at the left side in FIG. 26 is obtained. In this case, the number N of stages of the shift register is 3, and the output stage M for the EOR gate is the second stage. An output in an initial stage R0 is "1", an output in the next state R1 is "1", an output in the third state R2 is "0", ... An EOR signal of outputs in states R0, R1, and R3 is "0"; an EOR signal of outputs in the states R1, R2, and R4 is "0"; and an EOR signal of outputs in the states R6, R0, and R2 is "0". When outputs from the EOR gate in response to the respective states are sequentially set in the shift register R indicated by the broken line in FIG. 26, and the EOR outputs are shifted in a direction indicated by an arrow, then an EOR signal of the 0the, first, and third stage outputs is always "0" if the data is a PN pattern.

In general, in a PN pattern derived from an EOR signal of the Mth bit and the start bit in an N-stage shift register, an EOR signal of the start bit, the (N-M)th stage bit, and the Nth stage bit in the shift register R is always "0". Referring to FIG. 26, first four EOR signals using states R0 to R6 are produced. If an OR output of these four EOR signals is set at logic "0", the used data is a PN pattern.

In the PN pattern in FIG. 26, consecutive 3-bit patterns are different. Therefore, for example, three bits of the states R0 to R2, i.e., three bits of 0th to 2nd stages of the shift register can be monitored to detect an intraframe phase. It should be noted that the consecutive 3-bit data need not be monitored but a specific three bits can be monitored to obtain the same effect as described above.

In general, in a PN pattern obtained from the N-stage shift register, consecutive N-bit patterns are monitored to detect intraframe phases.

As shown in FIG. 25, assume that an input PCM signal is input to the shift register functional elements 222($l$) to 222($n$), and that the start bit is monitored by the EOR gates 223, 224 at the R0, R(N-M), and RN register stages. Also assume that these start bits constitute the PN pattern, as shown in FIG. 24. Under these assumptions, the monitor signal from the EOR gate is "0". The outputs from the shift register functional elements 222($l$) to 222($n$) are subjected to EOR calculations according to combinations shown in FIG. 26. These EOR signals are then logically ORed. If the OR signal is set at logic "0", the PN pattern has been detected.

When patterns derived from the sync bits $S_1$ to $S_{11}$ of the frames F1 to F12 are defined as PN patterns from a 4-bit shift register, the specific 4-bit patterns, e.g., consecutive 4-bit patterns, are monitored to detect intraframe phases.

As shown in FIG. 27, by using the phase detector 220 for detecting the intraframe phase signal, the frame sync pattern detector 221 for detecting the PN pattern, and the shift register section 222, frame sync patterns and the intraframe phases can be detected.

The phase detector 220 comprises a ROM. The frame sync pattern detector 221 calculates EOR signals of the signal transmitted from the shift register 222, as described above. If the logical states of all EOR signals are "0", the sync pattern detection signal is output. The shift register section 222 comprises shift register functional elements 222($l$) to 222($n$) which sequentially receive PCM pulses. Each of the shift register functional elements 222($l$) to 222($n$) has a length of bits corresponding to one frame.

In the above description, the frame sync pattern is the PN pattern. However, the frame sync pattern is not limited to such a pattern, but can be replaced with any pattern having the characteristics described above.

In the apparatus to FIGS. 21 to 26, shift register functional element outputs for monitoring the input PCM signal at different windows are input to detect whether or not the frame sync pattern has a length exceeding a predetermined length without limiting the phase to a specific phase, and at the same time to detect the intraframe phase. Therefore, the restoration time in the asynchronous state can be greatly shortened.

In the apparatus in FIG. 27, the intraframe phase can be detected by monitoring only a plurality of specific bits.

Still another embodiment of the present invention will be described with reference to FIGS. 28 to 30. FIG. 30 describes the basic principle of the apparatus in FIG. 31.

Figure 28:
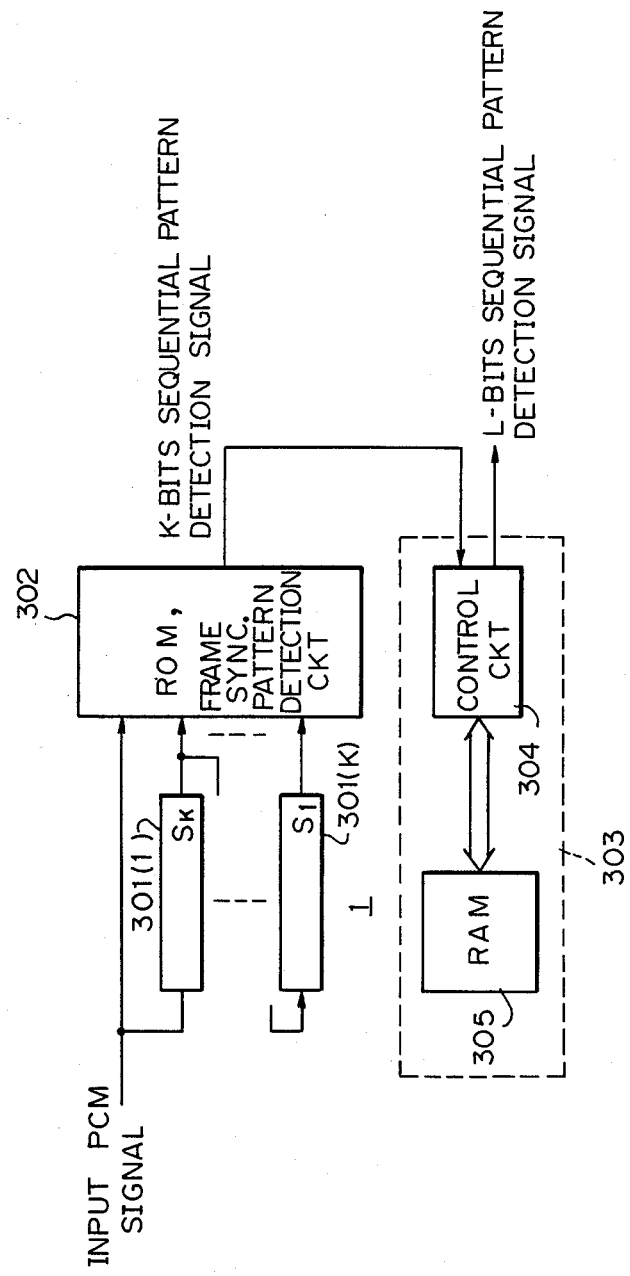
FIGS. 28 to 30 illustrate still another embodiment of the present invention.

Referring to FIG. 28, reference numeral 301 denotes a shift register section constituted by shift register functional elements 301($l$) to 301($k$); and 302, a frame sync pattern detector constituted by a read-only memory, ROM. Reference numeral 303 denotes a continuous pattern signal generator consisting of a control circuit 304, and a random access memory, RAM 305.

The shift register functional elements 301($l$) to 301($k$) sequentially shift the input data and are operated as in a shift register. The elements 301($l$) to 301(k) can be replaced with a shift register. However, since one frame has a length of 193 bits which is equal to 8 bits×24 CH plus one sync bit, use of a shift register results in an expensive arrangement. Therefore, a memory is subjected to address translation to constitute the shift register section 301.

The frame sync pattern detector 302 detects whether the bit pattern from the shift register functional elements 301($l$) to 301($k$) is the part of the frame sync pattern of sync bits $S_1$ to $S_{11}$ For example, the frame sync pattern detector 302 generates a k-bit continuous pattern detection signal representing that the continuous k-bit pattern from the shift register functional elements 301($l$) to 301($k$) is part, e.g., $S_1$ to $S_k$ (k<11), $S_2$ to $S_{k+1}$, $S_3$ to $S_{k+2}$, ..., of the frame sync pattern. Even if the bit pattern includes the alarm bit X, such as "$S_{11}$, X, $S_1$", it can be detected as part of the frame sync pattern.

If the shift register functional elements 301($l$) to 301($k$) have a length of 193 bits as an example, the continuous pattern signal detector 303 counts the number of K-bit continuous pattern detection signals for every 193-bit cycle. If one multiframe consists of L frames, the detector 303 counts the (L-k) k-bit continuous pattern detection signals. More specifically, the control circuit 304 writes value "1" in a specific area in the RAM 305 when the frame sync pattern detector 302 supplies the first k-bit continuous pattern detection signal to the detector 303. In the next 193-bit cycle, the k-bit continuous pattern detection signal is supplied to the detector 303 again. In this case, the control circuit 304 reads out the current value "1" and updates it to value "2". The updated value is stored in the specific area of the RAM 305 again. If the (L-k)th k-bit continuous pattern detection signal is supplied to the detector 303, the control circuit 304 generates an L-bit continuous pattern detection signal, i.e., acknowledges frame sync pattern detection. If another k-bit continuous pattern detection signal is not supplied to the detector 303 within the predetermined period of time, the control circuit 304 clears the specific area of the RAM 305 to zero.

In the apparatus in FIG. 28, when the frame sync pattern are detected as a plurality of consecutive bits such as "$S_1$, $S_2$, $S_3$", "$S_2$, $S_3$, $S_4$", "$S_3$, $S_4$, $S_5$", ..., sync pattern detection is discriminated. Therefore, synchronization can be restored by small capacity shift register functional elements within a short period of time.

In the above description, the frame sync pattern detector 302 comprises a ROM. A necessary number of bits out of the outputs from the shift register functional elements is input as a ROM address. However, the frame sync pattern detector 302 is not limited to the ROM, but can be replaced with a plurality of AND (NAND) gates having a k-bit input circuit and corresponding to part of the frame sync pattern. For example, a "0" pattern input portion is made to be a NOR input terminal.

Figure 31:
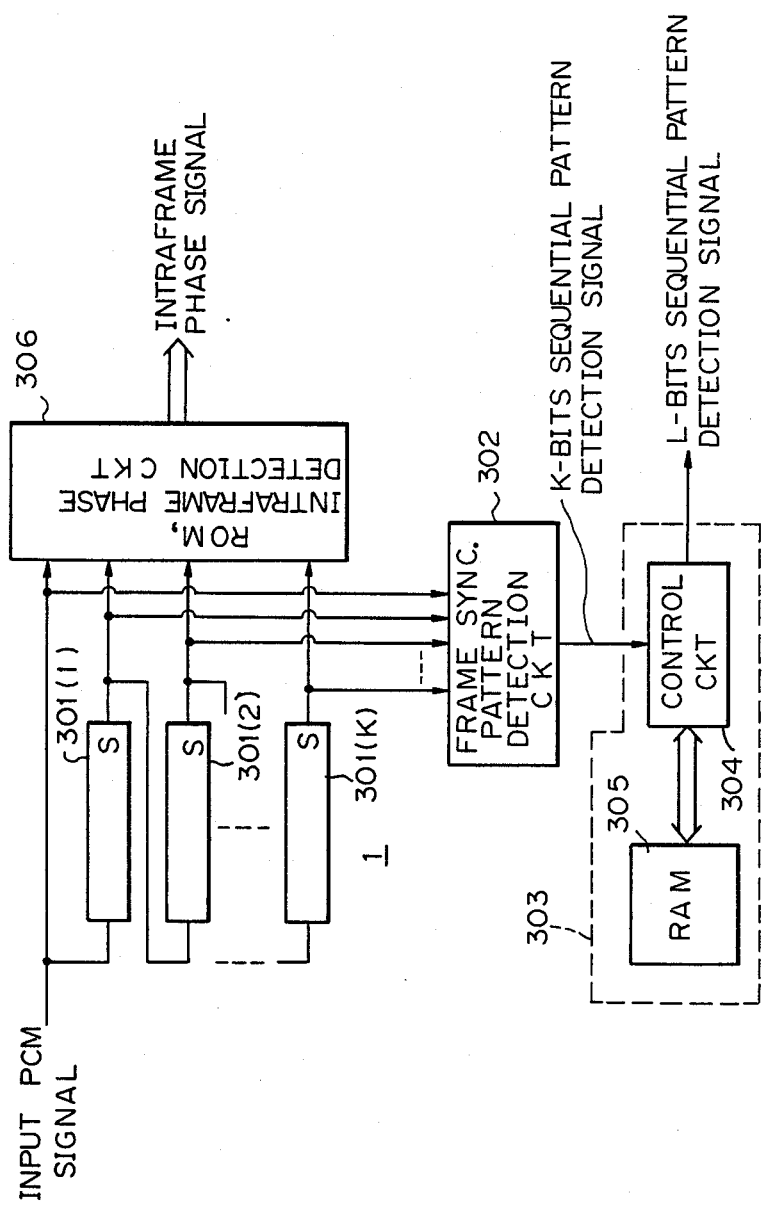
FIG. 31 illustrates still another embodiment of the present invention.

Still another embodiment of the present invention is shown in FIG. 31. In the apparatus of FIG. 31, an intraframe phase detector 306 is added. "Intraframe phase detection" is defined as detection for discriminating a state "$S_2, S_3, \ldots S_{11}, X, S_1$", a state "$S_3, S_4, \ldots S_1, S_2$", and so on when the frame sync pattern has an order "$S_1, S_2, \ldots S_{11}, X$" in one multiframe. If "$S_1, S_2, \ldots$" is given as the first phase within the frame, "$S_2, S_3, \ldots$" is the second phase, and $S_3, S_4, \ldots$" is the third phase. Therefore, if signalling is present in each frame at the first phase, the position of the sixth frame F6 can be immediately detected. Similarly, the position of the sixth frame F6 is immediately detected, thereby establishing perfect synchronization.

Intraframe phase detection can be achieved by monitoring all sync bits $S_1$ to $S_{11}$. However, a smaller number of sync bits can be monitored to achieve intraframe phase detection according to the types of pattern.

An example of such a pattern is a PN pattern (pseudo random pattern) and will be also briefly described with reference to FIG. 26.

In general, a PN pattern is obtained by an EOR gate for producing a logical EOR signal of an N-stage shift register output bit and a signal of the Mth stage. The EOR signal is supplied to the shift register. If the number of stages of the shift register is N, the number of patterns in the shift register is $2^N-1$, excluding all "0"s. The output signal from the EOR gate is repeatedly output as PN pattern having a length of $(2^N-1)$ bits. The PN pattern characteristics will be described using a 3-stage shift register. If data "101" is set in the 3-stage shift register, an EOR signal of the central and output stages is "1". If the data is sequentially shifted bit by bit, a 7-bit PN pattern shown at the left side in FIG. 26 is obtained. In this case, the number N of stages of the shift register is 3, and the output stage M for the EOR gate is the second stage. In the PN pattern, any consecutive 3-bit patterns are different. Therefore, when, for example, three bits of the states R0 to R2, i.e., the PN pattern is set in the shift register R, three bits of the 0th to 2nd stages can be monitored to detect an intraframe phase. It should be noted that the consecutive 3-bit data need not be monitored but specific three bits can be monitored to obtain the same effect as described above.

In general, in a PN pattern obtained from the N-stage shift register, consecutive N-bit patterns are monitored to detect intraframe phases. If a PN pattern is used as a frame sync pattern "$S_1, S_2, \ldots S_{11}$", e.g., if a PN pattern derived from a 4-stage shift register is used as the pattern "$S_1, S_2, \ldots S_{11}$", signals output from the consecutive 4-stage shift register functional elements are monitored as the sync bits, thereby discriminating the corresponding intraframe phase. However, the pattern is not limited to the PN pattern but can be replaced with a pattern having similar characteristics.

In the apparatus of FIG. 31, the intraframe phase detector 306 monitors the outputs from the shift register functional blocks 301(1) to 301($k$). If the output is part of the frame sync pattern, the intraframe phase detector 306 generates a corresponding intraframe phase. If the frame sync pattern is a PN pattern derived from a 4-stage shift register, the intraframe phase can be discriminated by monitoring its specific 4-bit pattern.

In the apparatus of FIG. 31, when input PCM signals are sequentially transmitted and sync bits S are located at the start positions of the shift register functional elements 301($l$) to 301($k$), a frame sync pattern detector 302 detects these sync bits and supplies the detection signal to a control circuit 304. In response to the detection signal, the control circuit 304 writes a detection count "1" in a RAM 305. Each k-bit continuous pattern detection signal is supplied for every predetermined period of time. When a detection count reaches a predetermined value, the control circuit 304 generates an L-bit continuous pattern detection signal. In this case, the intraframe phase detector 306 outputs an intraframe phase signal, as described above. Even if the PCM signal reception is subjected to an asynchronous state, perfect synchronization can be restored within a short period of time.

Figure 29:
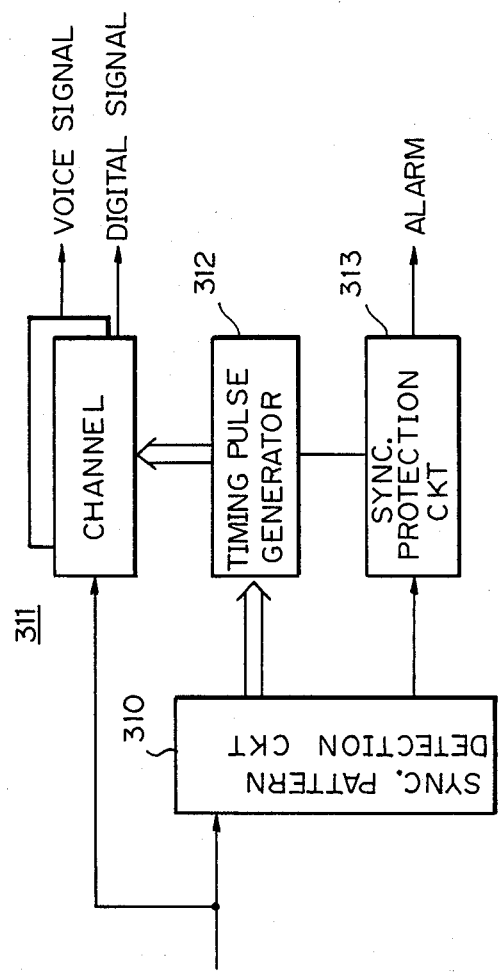
Figure 30:
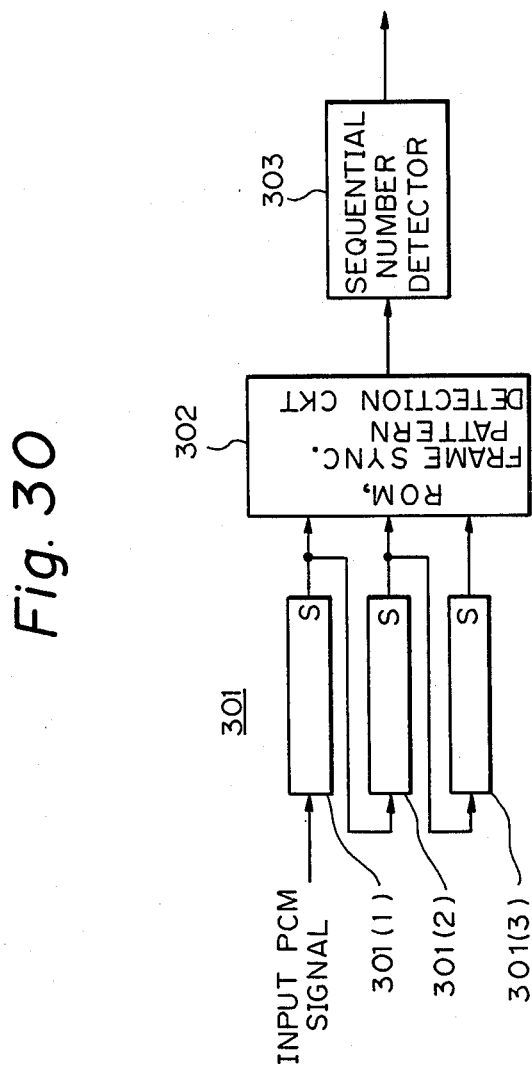

The PCM communication system using the apparatus in FIG. 28 is illustrated in FIG. 29. In the system in FIG. 29, if an asynchronous state occurs upon hunting, the sync pattern detector 310, the shift register functional elements 301($l$) to 301($n$), and the frame sync pattern detector 302 cooperate to immediately generate the sync pattern detection signal and the intraframe phase signal, thereby restoring the synchronous state. The sync pattern detection signal is sent to the sync protective circuit 313, which supplies a timing signal to the timing pulse generator 312 in response thereto. Since the intraframe phase signal has been received by the timing pulse generator 312, it can detect which frame signal is sent to the channel circuit 311. A digital signal from a data terminal or the like is output as a digital signal. In the case of the audio signal, an analog audio signal converted by the channel circuit 311 is output. In this case, signalling is present in the sixth and 12th frames F6 and F12 so that these frame signals can be read out.

In the apparatus of FIG. 28, multi-point monitor frame sync pattern detection can be achieved by using small-capacity shift register function elements such as memory elements.

In the apparatus of FIG. 31, post-protection state or synchronization established state can be achieved at any phase in the hunting state. Therefore, synchronization restoration time can be shortened.

We claim:

1. A digital signal transmission system having a frame synchronization operation for transmitting frame synchronization patterns with a predetermined cyclic period, said system comprising:
   a synchronization pattern detection circuit for detecting a synchronization pattern in response to a received digital signal;
   a pseudo synchronization detection circuit for detecting a pseudo synchronization pattern in the form of an error detection code in response to the received digital signal;
   a synchronization protection circuit for counting the synchronization pattern detection signals produced when synchronization patterns are detected in response to a synchronization pattern detection signal from said synchronization pattern detection circuit, said synchronization protection circuit comprising:
   main synchronization counter circuit means, operatively connected to said synchronization pattern detection circuit and said pseudo-synchronization pattern detection circuit, for producing a main protective count for confirmation of synchronization recovery; and
   auxiliary synchronization counter circuit means, operatively connected to said synchronization pattern detection circuit, for producing a variable protective count for confirmation of synchronization recovery in dependence upon synchronization/asynchronization of said main synchronization counter circuit means; and
   control means for supplying a step control signal to said auxiliary synchronization counter circuit means to control a number of protection steps used by said auxiliary synchronization counter circuit means, the number of protection steps determining the variable protective count of said auxiliary synchronization counter circuit means.

2. A system according to claim 1, wherein the main and variable protective counts of said main and auxiliary synchronization counter circuit means, respectively, both substantially represent a time length.

3. A system according to claim 1,
   wherein said control means comprises means for operating said main synchronization counter circuit means and said auxiliary synchronization counter circuit means in conjunction to produce a synchronized state of each of said main and auxiliary synchronization counter circuit means when a synchronized count of the synchronization pattern detection signals produced from said synchronization pattern detection circuit becomes more than a corresponding one of first and second predetermined protective counts for synchronization and to produce an asynchronized state of each of said main and auxiliary synchronization counter circuit means when an asynchronized count of the asynchronized state due to production of the synchronization pattern detection signal without a predetermined timing becomes more than a third predetermined protective count for asynchronization, and to replace timing for counting for asynchronization counter circuit means with the timing for counting in said auxiliary synchronization counter circuit means when the pseudo synchronization pattern is detected by said pseudo synchronization detection circuit, said auxiliary synchronization counter circuit means is in a synchronized state and said main synchronization counter circuit means is in a synchronized state, and wherein the second predetermined protective count for synchronization defining the synchronization recovery of said auxiliary synchronization counter circuit means is selected to be larger than the first predetermined protective count for synchronization defining the synchronization recovery of said main synchronization counter circuit means.

4. A system according to claim 1,
wherein said digital signal transmission system includes a digital signal transmitter device in a transmitter operatively connected to said pseudo synchronization circuit, and
wherein said pseudo synchronization circuit comprises:
means monitoring an error detection code applied to digital data transmitted from the digital signal transmission device in the transmitter, to detect pseudo synchronization in frame synchronization in dependence upon the monitoring;
means for putting back a transmitted code transmitted from the transmitter after displacing of the error detection code in the transmitter; and
means for detecting pseudo synchronization using the error detection code obtained by putting back the transmitted code.

5. A system according to claim 4,
wherein the error detection code displaced in said transmitter is a cyclic redundancy code, and
wherein said transmitter comprises means for displacing the cyclic redundancy code by a varied value.

6. A system according to claim 1, wherein said synchronization pattern detection circuit comprises:
means for multi-point monitoring of the received digital signal, including shift register means having a plurality of shift registers for shifting sequentially supplied digital signals; and
detection means, responsive to the sequentially supplied digital signals from said shift register means, for detecting existence of one of the synchronization patterns having a length lower than a predetermined length and a phase in a frame of the detected synchronization pattern, the detecting of the synchronization pattern being performed for plural phases of the detected synchronization pattern to produce synchronization pattern detection data and phase data.

7. A system according to claim 6,
further comprising means for generating a pseudo random signal to be used for the synchronization patterns, and
wherein said multi-point monitoring means monitors an exclusive OR logic of predetermined specific bits.

8. A system according to claim 6, wherein said detection means comprises phase detection means for monitoring a predetermined bit of the frame synchronization pattern and for detecting and delivering the phase in the frame in accordance with the monitoring.

9. A system according to claim 1,
wherein the received digital signal received by said synchronization pattern detection circuit has a frame length of M bits including a frame synchronization pattern of a multiple frame number of N, and
wherein said synchronization pattern detection circuit comprises monitoring/detecting means for multipoint monitoring of the received digital signal and for detecting a synchronization pattern of sequential L bits, said monitoring/detection means including:
shift register means, having K shift register functional members receiving sequentially supplied digital signals, for carrying out K bit multi-point monitoring where K is smaller than L;
synchronization detection means for detecting whether the outputs of said K shift register functional members are a frame synchronization pattern having a length of K bits; and
sequential number detection and storage means for detecting and storing the number of frames discriminated as the frame synchronization pattern, detection of the synchronization pattern of sequential L bits being determined when a predetermined sequential number of detections of the frame synchronization pattern is obtained.

10. A system according to claim 9, wherein said system further comprises phase detection means for detecting a phase in a frame of the frame synchronization pattern by monitoring a predetermined specific bit of the output of said shift register means.

* * * * *